(12) United States Patent
Arik et al.

(10) Patent No.: US 11,651,763 B2
(45) Date of Patent: *May 16, 2023

(54) MULTI-SPEAKER NEURAL TEXT-TO-SPEECH

(71) Applicant: Baidu USA, LLC, Sunnyvale, CA (US)

(72) Inventors: Sercan O. Arik, San Francisco, CA (US); Gregory Diamos, San Jose, CA (US); Andrew Gibiansky, Mountain View, CA (US); John Miller, Palo Alto, CA (US); Kainan Peng, Sunnyvale, CA (US); Wei Ping, Sunnyvale, CA (US); Jonathan Raiman, Palo Alto, CA (US); Yanqi Zhou, San Jose, CA (US)

(73) Assignee: Baidu USA LLC, Sunnyvale, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 17/087,524

(22) Filed: Nov. 2, 2020

(65) Prior Publication Data

US 2021/0049999 A1 Feb. 18, 2021

Related U.S. Application Data

(62) Division of application No. 15/974,397, filed on May 8, 2018, now Pat. No. 10,896,669.

(Continued)

(51) Int. Cl.
*G10L 13/04* (2013.01)
*G10L 13/08* (2013.01)
(Continued)

(52) U.S. Cl.
CPC .............. *G10L 13/08* (2013.01); *G10L 15/04* (2013.01); *G10L 15/063* (2013.01); *G10L 25/30* (2013.01)

(58) Field of Classification Search
CPC ......... G10L 13/04; G10L 13/00; G10L 13/02; G10L 13/047; G10L 13/08;
(Continued)

(56) References Cited

U.S. PATENT DOCUMENTS 5,970,453 A 10/1999 Sharman
6,078,885 A 6/2000 Beutnagel
(Continued)

OTHER PUBLICATIONS

Y. Agiomyrgiannakis,"Vocaine the vocoder and applications in speech synthesis," In ICASSP, 2015. (5 pgs).
(Continued)

*Primary Examiner* — Qi Han
(74) *Attorney, Agent, or Firm* — North Weber & Baugh LLP

(57) ABSTRACT

Described herein are systems and methods for augmenting neural speech synthesis networks with low-dimensional trainable speaker embeddings in order to generate speech from different voices from a single model. As a starting point for multi-speaker experiments, improved single-speaker model embodiments, which may be referred to generally as Deep Voice 2 embodiments, were developed, as well as a post-processing neural vocoder for Tacotron (a neural character-to-spectrogram model). New techniques for multi-speaker speech synthesis were performed for both Deep Voice 2 and Tacotron embodiments on two multi-speaker TTS datasets—showing that neural text-to-speech systems can learn hundreds of unique voices from twenty-five minutes of audio per speaker.

20 Claims, 22 Drawing Sheets

Related U.S. Application Data

(60) Provisional application No. 62/508,579, filed on May 19, 2017.

(51) Int. Cl.
  *G10L 15/04* (2013.01)
  *G10L 15/06* (2013.01)
  *G10L 25/30* (2013.01)

(58) Field of Classification Search
  CPC ......... G10L 2013/021; G10L 2013/083; G10L 2013/105
  USPC ....... 704/266, 258, 259, 260, 261, 264, 267, 704/268, 269
  See application file for complete search history.

(56) References Cited

U.S. PATENT DOCUMENTS

| | | | |
|---|---|---|---|
| 6,366,884 | B1 | 4/2002 | Bellegarda |
| 7,412,393 | B1 | 8/2008 | De Fabbrizio |
| 8,160,877 | B1 | 4/2012 | Nucci et al. |
| 8,527,276 | B1 | 9/2013 | Senior |
| 8,898,062 | B2 | 11/2014 | Kato |
| 9,508,341 | B1 | 11/2016 | Parlikar |
| 10,134,388 | B1 | 11/2018 | Lilly |
| 10,255,905 | B2 | 4/2019 | Chua |
| 10,319,364 | B2 | 6/2019 | Reber |
| 11,062,615 | B1* | 7/2021 | Speciner ............... G09B 5/06 |
| 2001/0012999 | A1 | 8/2001 | Vitale |
| 2002/0026315 | A1 | 2/2002 | Miranda |
| 2003/0212555 | A1 | 11/2003 | van Santen |
| 2004/0039570 | A1 | 2/2004 | Harengel |
| 2004/0193398 | A1 | 9/2004 | Chu |
| 2004/0196964 | A1 | 10/2004 | Bluvband |
| 2005/0033575 | A1 | 2/2005 | Schneider |
| 2005/0119890 | A1 | 6/2005 | Hirose |
| 2005/0137870 | A1 | 6/2005 | Mizutani |
| 2005/0182629 | A1 | 8/2005 | Coorman |
| 2005/0192807 | A1 | 9/2005 | Emam |
| 2006/0069566 | A1 | 3/2006 | Fukada |
| 2006/0149543 | A1 | 7/2006 | Lassalle |
| 2006/0200344 | A1 | 9/2006 | Kosek |
| 2006/0271367 | A1* | 11/2006 | Hirabayashi ............ G10L 13/10 704/E13.013 |
| 2007/0005337 | A1 | 1/2007 | Mount |
| 2007/0094030 | A1 | 4/2007 | Xu |
| 2007/0118377 | A1 | 5/2007 | Badino |
| 2007/0150271 | A1 | 6/2007 | Virette |
| 2007/0168189 | A1 | 7/2007 | Tamura |
| 2007/0233494 | A1 | 10/2007 | Shen |
| 2007/0271099 | A1 | 11/2007 | Kagoshima |
| 2008/0114598 | A1 | 5/2008 | Prieto |
| 2008/0167862 | A1 | 7/2008 | Mohajer |
| 2009/0157383 | A1 | 6/2009 | Cho |
| 2010/0004934 | A1 | 1/2010 | Hirose |
| 2010/0312562 | A1 | 12/2010 | Wang |
| 2011/0087488 | A1 | 4/2011 | Morinaka |
| 2011/0202355 | A1 | 8/2011 | Grill |
| 2012/0035933 | A1 | 2/2012 | Conkie |
| 2012/0143611 | A1 | 6/2012 | Qian |
| 2012/0203557 | A1 | 8/2012 | Odinak |
| 2012/0265533 | A1 | 10/2012 | Honeycutt |
| 2013/0132085 | A1 | 5/2013 | Mysore |
| 2013/0262096 | A1 | 10/2013 | Wilhelms-Tricarico |
| 2013/0325477 | A1 | 12/2013 | Mitsui |
| 2014/0046662 | A1 | 2/2014 | Tyagi |
| 2014/0236597 | A1 | 8/2014 | Ben Ezra |
| 2015/0186359 | A1 | 7/2015 | Fructuoso |
| 2015/0199956 | A1 | 7/2015 | Tan |
| 2015/0243275 | A1 | 8/2015 | Luan |
| 2015/0279358 | A1 | 10/2015 | Kingsbury |
| 2016/0012035 | A1 | 1/2016 | Tachibana |
| 2016/0078859 | A1 | 3/2016 | Luan |
| 2016/0140951 | A1 | 5/2016 | Agiomyrgiannakis |
| 2016/0343366 | A1 | 11/2016 | Fructuoso |
| 2016/0365085 | A1 | 12/2016 | Raghavendra |
| 2017/0053642 | A1 | 2/2017 | Yamamoto |
| 2017/0148433 | A1 | 5/2017 | Catanzaro |
| 2017/0162186 | A1 | 6/2017 | Tamura |
| 2017/0308789 | A1 | 10/2017 | Langford |
| 2019/0122651 | A1 | 4/2019 | Arik et al. |

OTHER PUBLICATIONS

Arik et al.,"Deep Voice: Real-time neural text-to-speech," arXiv preprint arXiv:1702.07825v2, 2017. (17 pgs).

Arik et al.,"Deep Voice 2: Multi-speaker neural text-to-speech," arXiv preprint arXiv:1705.08947v1,2017. (15 pgs).

C. Bagwell,"SoX—Sound exchange," [online], [Retrieved Jul. 22, 2019], Retrieved from Internet <URL:https://sourceforge.net/p/sox/code/ci/master/tree/> (3 pgs).

Bahdanau et al.,"Neural machine translation by jointly learning to align and translate," arXiv preprint arXiv:1409.0473v1, 2014. (15pgs).

Capes et al.,"Siri On-Device Deep Learning-Guided Unit Selection Text-to-Speech System," In Interspeech, 2017. (5pgs).

Cho et al.."Learning phrase representations using RNN encoder-decoder for statistical machine translation," In EMNLP, 2014. (11 pgs).

Chorowski et al., "Attention-based models for speech recognition," In NIPS, 2015. (9pgs).

Dauphin et al.,"Language modeling with gated convolutional networks," arXiv preprint arXiv:1612.08083v1, 2016. (8pgs).

Gehring et al.,"Convolutional sequence to sequence learning," arXiv preprint arXiv:1705.03122v1, 2017. (15 pgs).

Gonzalvo et al.,"Recent advances in Google real-time HMM-driven unit selection synthesizer," In Interspeech, 2016. (5 pgs).

Kawahara et al.,"Restructuring speech representations using a pitch-adaptive time-Frequency smoothing and an instantaneous-frequency-based F0 extraction: Possible role of a repetitive structure in sounds," Speech communication, 1999. (21 pgs).

Mehri et al.,"SampleRNN: An unconditional end-to-end neural audio generation model," In ICLR, 2017. (11 pgs).

Morise et al.,"WORLD: A vocoder-based high-quality speech synthesis system for real-time applications," IEICE Transactions on Information and Systems, 2016. (8pgs).

Ochshorn et al., "Gentle," Retrieved from Internet <URL: https://github.com/lowerquality/gentle> 2017. (2 pgs).

Van den Oord et al.,"WaveNet: A generative model for raw audio," arXiv:1609.03499, 2016. (15 pgs).

Panayotov et al.,"Librispeech: an ASR corpus based on public domain audio books," In Acoustics, Speech and Signal Processing (ICASSP), 2015 IEEE. (5 pgs).

Raffel et al.,"Online and linear-time attention by enforcing monotonic alignments," arXiv:1704.00784v1, 2017. (19 pgs).

Ribeiro et al.,"Crowdmos: An approach for crowdsourcing mean opinion score studies," In IEEE ICASSP, 2011. (4 pgs).

Rush et al.,"A neural attention model for abstractive sentence summarization," In EMNLP, 2015. (11 pgs).

Salimans et al.,"Weight normalization: A simple reparameterization to accelerate training of deep neural networks," In NIPS, arXiv:1602.07868v3, 2016. (11 pgs).

Sotelo et al.,"Char2wav: End-to-end speech synthesis," In ICLR workshop, 2017. (6 pgs).

Sutskever et al., "Sequence to Sequence Learning with Neural Networks", In NIPS, 2014. (9 pgs).

Taigman et al., "Voiceloop: Voicefitting Andsynthesis Via Aphonologicalloop", arXiv preprint arXiv:1707.06588, 2017. (12pgs).

Paul Taylor,"Text-to-Speech Synthesis,"[online], [Retrieved Aug. 1, 2019]. Retrieved from Internet <URL: <http://citeseerx.ist.psu.edu/viewdoc/download?doi=10.1.1.118.5905&rep=rep1&type=pdf> Cambridge University Press, 2009 (22 pgs).

Vaswani et al., "Attention Is All You Need", arXiv preprint arXiv:1706.03762, 2017.(15 pgs).

Wang et al.,"Tacotron:Towards End-to-End speech synthesis", In Interspeech, 2017.(5 pgs).

(56) References Cited

OTHER PUBLICATIONS

Yamagishi et al., "Robust Speaker-Adaptive HMM-Based Text-to-Speech Synthesis," In IEEE Transactions on Audio, and Language Processing, 2009. (23pgs).
Yamagishi et al., "Thousands of Voices for HMM-Based Speech Synthesis-Analysis and Application of TTS Systems Built on Various ASR Corpora", In IEEE Transactions on Audio, Speech, and Language Processing, 2010. (21 pgs).
Yamagishi et al.,"Robust Speaker-Adaptive HMM-Based Text-to-Speech Synthesis," IEEE Transactions On Audio, Speech, and Language Processing, vol. 17, No. 6, Aug. 2009, [online], [Retrieved Jul. 8, 2018]. Retrieved from Internet <URL: <https://www.researchgate.net/publication/224558048> (24 pgs).
Non-Final Office Action, dated Jan. 5, 2022, in related U.S. Appl. No. 17/061,433. (10 pgs).
Lample et al.,"Neural architectures for named entity recognition," arXiv preprint arXiv:1603.01360, 2016. (10 pgs).
Li et al.,"Deep speaker: an End-to-End neural speaker embedding system," arXiv preprint arXiv:1705.02304, 2017. (8 pgs).
Mehri et al.,"SampleRNN: An unconditional End-to-End neural audio generation model," arXiv preprint arXiv:1612.07837, 2016. (11 pgs).
Oord et al.,"WaveNet: A generative model for raw audio," arXiv preprint arXiv:1609.03499, 2016. (15 pgs).
Reynolds et al.,"Speaker verification using adapted gaussian mixture models," Digital signal processing, 10(1-3):19—41, 2000. (23 pgs).
Ronanki et al.,"Median-based generation of synthetic speech durations using a non-parametric approach," arXiv preprint arXiv:1608.06134, 2016. (7 pgs).
Salimans et al.,"Improved techniques for training GANs," In NIPS, 2016. (9 pgs).
Sotelo et al.,"CHAR2WAV: End-to-End speech synthesis," In ICLR2017 workshop submission, 2017. (6pgs).
Wang et al.,"Tacotron: Towards end-to-end speech synthesis," In Interspeech, 2017. (3 pgs) 2006. (8 pgs).
Kingma et al.,"Adam: A method for stochastic optimization," arXiv preprint arXiv:1412.6980, 2014. (9 pgs).
Oord et al.,"Pixel recurrent neural networks," arXiv preprint arXiv:1601.06759, 2016. (10 pgs).
Paine et al.,"Fast wavenet generation algorithm," arXiv preprint arXiv:1611.09482, 2016. (6 pgs).
Pascual et al.,"Multi-output RNN-LSTM for multiple speaker speech synthesis with interpolation model," 9th ISCA Speech Synthesis Workshop, 2016. (6 pgs).
Prahallad et al.,"The blizzard challenge 2013—Indian language task," Retrieved from Internet <URL: <http://festvox.org/blizzard/bc2013/blizzard_2013_summary_indian.pdf>, 2013. (11 pgs).
Rao et al.,"Grapheme-to-phoneme conversion using long short-term memory recurrent neural networks," In Acoustics, Speech and Signal Processing (ICASSP).
Zen et al.,"Unidirectional long short-term memory recurrent neural network with recurrent output layer for low-latency speech synthesis," Retrieved from Internet <URL: <https://static.googleusercontent.com/media/research.google.com/en//pubs/archive/43266.pdf>, 2015. (5pgs).
Zen et al.,"Statistical parametric speech synthesis using deep neural networks," Retrieved from Internet <URL: <https://static.googleusercontent.com/media/research.google.com/en//pubs/archive/40837.pdf>, 2013. (5pgs).
Odena et al.,"Deconvolution and checkerboard artifacts," 2016, [Retrieved Sep. 3, 2019]. Retrieved from Internet <URL:<https://distill.pub/2016/deconv-checkerboard/>.(10pgs).
Pascanu et al.,"On the difficulty of training recurrent neural networks," In ICML, 2013. (9pgs).
Ping et al.,"Deep Voice 3: Scaling text-to-speech with convolutional sequence learning," In ICLR, 2018. (16pgs).
Rezende et al.,"Variational inference with normalizing flows," In ICML, 2015. (10 pgs).
Ribeiro et al.,"CrowdMOS: An approach for crowdsourcing mean opinion score studies," In ICASSP, 2011. (4 pgs).
Roy et al.,"Theory and experiments on vector quantized autoencoders," arXiv preprint arXiv:1805.11063, 2018. (11 pgs).
Salimans et al.,"PixelCNN++: Improving the PixelCNN with discretized logistic mixture likelihood and other modifications," In ICLR, 2017. (10pgs).
Shen et al.,"Natural TTS synthesis by conditioning WaveNet on mel spectrogram predictions," In ICASSP, 2018. (5pgs).
Sotelo et al.,"Char2wav:End-to-end speech synthesis," ICLR workshop, 2017. (6pgs).
Taigman et al.,"VoiceLoop: Voice fitting and synthesis via a phonological loop," In ICLR, 2018.(14 pgs).
Gehring et al.,"Convolutional sequence to sequence learning," In ICML, 2017. (15pgs).
Hsu et al.,"Hierarchical generative modeling for controllable speech synthesis," In ICLR, 2019. (27pgs).
Jia et al.,"Transfer learning from speaker verification to multispeaker text-to-speech synthesis," arXiv preprint arXiv:1806.04558, 2019. (15pgs).
Kaiser et al.,"Fast decoding in sequence models using discrete latent variables," arXiv preprint arXiv:1803.03382, 2018. (10pgs).
Kalchbrenner et al.,"Efficient neural audio synthesis," arXiv preprint arXiv:1802.08435, 2018. (10pgs).
Kim et al.,"FloWaveNet: A generative flow for raw audio," arXiv preprint arXiv:1811.02155, 2019. (9pgs).
Notice of Allowance and Fee(s) Due, dated Jan. 22, 2021, in related U.S. Appl. No. 16/654,955. (10 pgs).
A.van den Oord et al.,"Parallel WaveNet: Fast high-fidelity speech synthesis," In ICML, 2018. (9pgs).
U.S. Appl. No. 16/654,955, Kainan Peng, Parallel Neural Text-To-Speech, filed Oct. 16, 2019.
P. Taylor"Text-to-Speech Synthesis," Cambridge University Press, 2009. (17pgs).
Van den Oord et al.,"WaveNet: A generative model for raw audio," arXiv preprint arXiv:1609.03499, 2016. (15pgs).
Van den Oord et al.,"Neural discrete representation learning," arXiv preprint arXiv:1711.00937, 2018. (11 pgs).
Van den Oord et al.,"Parallel WaveNet: Fast high-fidelity speech synthesis," arXiv preprint arXiv:1711.10433, 2017. (11 pgs).
Wang et al.,"Neural source-filter-based waveform model for statistical parametric speech synthesis," arXiv preprint arXiv:1904.12088, 2019. (14pgs).
Wang et al.,"Tacotron: Towards end-to-end speech synthesis,"arXiv preprint arXiv:1703.10135, 2017. (10pgs).
Notice of Allowance and Fee(s) Due, dated Feb. 24, 2022, in related U.S. Appl. No. 17/129,752. (11 pgs).
Aaron et al.,"Parallel WaveNet: Fast High-Fidelity Speech Synthesis," arXiv preprint arXiv:1711.10433, 2017. (11pgs).
Zhao et al., "Wasserstein GAN and Waveform Loss-based Acoustic Model Training for Multi-speaker Text-to-Speech Synthesis Systems Using a Wave Net Vocoder," arXiv preprint arXiv: 1807.11679, 2018. (10pgs).
Wu et al.,"A study of speaker adaptation for DNN-based speech synthesis," In Interspeech, 2015. (5 pgs).
Yamagishi et al.,"Robust speaker-adaptive HMM-based text-to-speech synthesis," IEEE Transactions on Audio, Speech, and Language Processing, 2009. (23 pgs).
Yang et al.,"On the training of DNN-based average voice model for speech synthesis," In Signal & Info. Processing Association Annual Summit & Conference (APSIPA), Retrieved from Internet <URL: <http://www.nwpu-aslp.org/lxie/papers/2016APSIPA-YS.pdf>, 2016. (6 pgs).
Zen et al.,"Unidirectional long short-term memory recurrent neural network with recurrent output layer for low-latency speech synthesis," In IEEE ICASSP, 2015. (5 pgs).
Zen et al.,"Fast, Compact, and High quality LSTM-RNN based statistical parametric speech synthesizers for mobile devices," arXiv:1606.06061, 2016. (14 pgs) 2015 IEEE International Conference, 2015.(5 pgs).
Ribeiro et al.,"Crowdmos: An approach for crowdsourcing mean opinion score studies," In Acoustics, Speech & Signal Processing (ICASSP) IEEE Intr Conference, 2011. (4 pgs).

(56) References Cited

OTHER PUBLICATIONS

Ronanki et al.,"A template-based approach for speech synthesis intonation generation using LSTMs," Interspeech 2016, pp. 2463-2467, 2016. (5pgs).
Sotelo et al.,"Char2wav: End-to-End speech synthesis," Retrieved from Internet <URL:<https://openreview.net/pdf?id-B1VWyySKx>, 2017. (6pgs).
Stephenson et al.,"Production Rendering, Design and Implementation," Springer, 2005. (5pgs).
Taylor et al.,"Text-to-Speech Synthesis," Cambridge University Press, New York, NY, USA, 1st edition, 2009. ISBN 0521899273, 9780521899277. (17 pgs).
Theis et al.,"A note on the evaluation of generative models," arXiv preprint arXiv:1511.01844, 2015. (9 pgs).
Weide et al.,"The CMU pronunciation dictionary," Retrieved from Internet <URL: <http://www.speech.cs.cmu.edu/cgi-bin/cmudict>, 2008. (2pgs).
Yao et al.,"Sequence-to-sequence neural net models for grapheme-to-phoneme conversion," arXiv preprint arXiv:1506.00196, 2015. (5 pgs).
Kim et al.,"Sequence-level knowledge distillation," In EMNLP, 2016. (11 pgs).
Kingma et al.,"ADAM: A method for stochastic optimization," In ICLR, 2015. (15 pgs).
Kingma et al.,"Auto-Encoding variational Bayes," In ICLR, 2014. (14 pgs).
Kingma et al.,"Improving variational inference with inverse autoregressive flow," In NIPS, 2016. (9 pgs).
Lee et al.,"Deterministic non-autoregressive neural sequence modeling by iterative refinement," arXiv preprint arXiv:1802.06901, 2018. (11 pgs).
Morise et al.,"WORLD: a vocoder-based high-quality speech synthesis system for real-time applications," IEICE Transactions on Information & Systems, 2016. (8 pgs).
K. Murphy,"Machine learning, A probabilistic perspective," 2012, [online], [Retrieved Sep. 3, 2019]. Retrieved from Internet <URL: <https://doc.lagout.org/science/Artificial%20Intelligence/Machine%20learning/Machine%20Learning_%20A%20Probabilistic%20Perspective%20%5BMurphy%202012-08-24%5D.pdf> (24 pgs).
Ping et al,"Deep Voice 3: Scaling text-to-speech with convolutional sequence learning," arXiv preprint arXiv:1710.07654, 2018. (16pgs).
Peng et al.,"Parallel Neural Text-to-Speech," arXiv preprint arXiv:1905.08459, 2019. (14pgs).
Abdel-Hamid et al.,"Fast speaker adaptation of hybrid NN/HMM model for speech recognition based on discriminative learning of speaker code," In ICASSP, 2013. (5pgs).
Arik et al.,"Deep Voice: Real-time neural text-to-speech," arXiv preprint arXiv:1702.07825, 2017. (17 pgs).
Bradbury et al.,"Quasi-Recurrent Neural Networks," In ICLR, 2017. (12pgs).
Cho et al.,"Learning Phrase Representations using RNN Encoder-Decoder for statistical machine translation," arXiv:1406.1078, 2014. (14 pgs).
Fan et al.,"Multi-speaker modeling and speaker adaptation for DNN-based TTS synthesis," In IEEE ICASSP, 2015. (2 pgs).
Graves et al.,"Connectionist temporal classification: labelling unsegmented sequence data with recurrent neural networks," In Proceedings of the 23rd International Conference on Machine Learning (ICML), 2006. (8 pgs).
Hsu et al.,"Voice conversion from unaligned corpora using variational autoencoding wasserstein generative adversarial networks," arXiv:1704.00849, 2017. (5 pgs).
Ioffe et al.,"Batch normalization: Accelerating deep network training by reducing internal covariate shift," arXiv preprint arXiv:1502.03167, 2015. (10 pgs).
Kingma et al.,"Glow: Generative flow with invertible 1×1 convolutions," arXiv preprint arXiv:1807.03039, 2018. (15pgs).
Kingma et al.,"Auto-encoding variational Bayes," arXiv preprint arXiv:1312.6114, 2014. (14pgs).
Kingma et al.,"Improving variational inference with inverse autoregressive flow," In NIPS, 2016. (16pgs).
Lee et al.,"Deterministic non-autoregressive neural sequence modeling by iterative refinemen," arXiv preprint arXiv:1802.06901, 2018. (11 pgs).
Nachmani et al.,"Fitting new speakers based on a short untranscribed sample," arXiv preprint arXiv:1802.06984, 2018. (9pgs).
Ping et al.,"ClariNet: Parallel wave generation in end-to-end text-to-speech," arXiv preprint arXiv:1807.07281, 2019. (15pgs).
Prenger et al.,"WaveGlow: A flow-based generative network for speech synthesis,"[online], [Retrieved Mar. 3, 2020]. Retrieved from Internet <URL: https://ieeexplore.ieee.org/abstract/document/8683143>In ICASSP, 2019. (2pgs).
Rezende et al.,"Variational inference with normalizing flows," arXiv preprint arXiv:1505.05770, 2016. (10pgs).
Rezende et al.,"Stochastic backpropagation and approximate inference in deep generative models," arXiv preprint arXiv:1401.4082, 2014. (14pgs).
Gehring,"Convolutional sequence to sequence learing," In ICML, 2017. (10 pgs).
Ping et al.,"ClariNet: ParallelWave Generation in End-to-End Text-to-Speech," arXiv preprint arXiv:1807.07281, 2018. (12 pgs).
U.S. Appl. No. 17/129,752, Wei Ping, Waveform Generation Using End-To-End Text-To-Waveform System, Pending.
P. Taylor,"Text-to-Speech Synthesis," Cambridge University Press, 2009. [online], [Retrieved Sep. 3, 2019]. Retrieved from Internet <URL: <http://citeseerx.ist.psu.edu/viewdoc/download?doi=10.1.1.118.5905&rep=rep1&type=pdf>. (19 pgs).
Uria et al.,"RNADE: The real-valued neural autoregressive density-estimator," In Advances in Neural Information Processing Systems, pp. 2175-2183, 2013. (10pgs).
A.van den Oord et al.,"WaveNet: A generative model for raw audio," arXiv preprint arXiv:1609.03499, 2016. (15pgs).
A.van den Oord et al.,"Conditional image generation with PixelCNN decoders," In NIPS, 2016. (9pgs).
R. Yamamoto,"WaveNet vocoder," 2018 [online], [Retrieved Sep. 4, 2019], Retrieved from Internet <URL: <https://github.com/r9y9/wavenet_vocoder>. (6pgs).
Zhao et al.,"Wasserstein GAN & Waveform Loss-based acoustic model training for multi-speaker text-to-speech synthesis systems using a WaveNet vocoder,"IEEE Access,2018.(10pgs).
Arik et al.,"Deep Voice: Real-time neural text-to-speech," arXiv preprint arXiv:arXiv:1702.07825,2017. (17pgs).
Arik et al.,"Deep Voice 2: Multi-speaker neural text-to-speech," arXiv preprint arXiv:1705.08947, 2017. (15pgs).
Arik et al.,"Neural voice cloning with a few samples," arXiv preprint arXiv:1802.06006, 2018. (18pgs).
Arik et al.,"Fast spectrogram inversion using multi-head convolutional neural networks," arXiv preprint arXiv:1808.06719, 2018. (6pgs).
Bahdanau et al.,"Neural machine translation by jointly learning to align and translate," arXiv preprint arXiv:1409.0473, 2016. (15 pgs).
Bengio et al.,"Scheduled sampling for sequence prediction with recurrent neural networks," arXiv preprint arXiv:1506.03099, 2015. (9pgs).
Bowman et al.,"Generating sentences from a continuous space," In Proceedings of The 20th SIGNLL Conference on Computational Natural Language Learning, 2016. (12pgs).
Chen et al.,"Sample efficient adaptive text-to-speech," arXiv preprint arXiv:1809.10460, 2019. (16pgs).
Chung et al.,"A recurrent latent variable model for sequential data," arXiv preprint arXiv:1506.02216, 2016. (9pgs).
Denton et al.,"Stochastic video generation with a learned prior,"arXiv preprint arXiv:1802.07687, 2018. (12pgs).
Response to Non-Final Office Action, filed Apr. 5, 2022, in related U.S. Appl. No. 17/061,433. (12 pgs).
Final Office Action, dated May 13, 2022, in related U.S. Appl. No. 17/061,433. (10 pgs).
Notice of Allowance and Fee(s) Due, dated May 17, 2022, in related U.S. Appl. No. 17/129,752. (12 pgs).

(56) References Cited

OTHER PUBLICATIONS

Abadi et al.,"TensorFlow: Large-scale machine learning on heterogeneous systems," Retrieved from Internet <URL: http://download.tensorflow.org/paper/whitepaper2015.pdf>, 2015. (19pgs).
Arik et al.,"Deep Voice: Real-time neural text-to-speech," In ICML, 2017. (17pgs).
Arik et al.,"Deep Voice 2: Multi-speaker neural text-to-speech," In NIPS, 2017. (15 pgs).
Bahdanau et al.,"Neural machine translation by jointly learning to align and translate,"In ICLR, 2015. (15 pgs).
Bucilua et al.,"Model Compression," In ACM SIGKDD, 2006. (7 pgs).
Chung et al.,"A recurrent latent variable model for sequential data," In NIPS, 2015. (9pgs).
Dinh et al.,"NICE: Non-linear independent components estimation," arXiv preprint arXiv:1410.8516, 2015. (13 pgs).
Dinh et al.,"Density estimation using Real NVP," In ICLR, 2017. (32pgs).
Griffin et al.,"Signal estimation from modified short-time Fourier transform," IEEE Transactions on Acoustics, Speech, and Signal Processing, 1984. (8pgs).
Gu et al.,"Non-autoregressive neural machine translation," In ICLR, 2018. (13 pgs).
Hinton et al.,"Distilling the knowledge in a neural network," arXiv preprint arXiv:1503.02531, 2015. (9 pgs).
U.S. Appl. No. 15/882,926, U.S. Pat. No. 10,872,598, Sercan Arik, Systems and Methods for Real-Time Neural Text-To-Speech, filed Jan. 29, 2018, Dec. 22, 2020.
U.S. Appl. No. 17/061,433, Sercan Arik, Real-Time Neural Text-To-Speech, Pending.
U.S. Appl. No. 15/974,397, U.S. Pat. No. 10,896,669, Sercan Arik, Systems and Methods for Multi-Speaker Neural Text-To-Speech, filed May 8, 2018, Jan. 19, 2021.
U.S. Appl. No. 17/087,524, Sercan Arik, Multi-Speaker Neural Text-To-Speech, Pending.
U.S. Appl. No. 16/058,265, U.S. Pat. No. 10,796,686, Sercan Arik, Systems and Methods for Neural Text-To-Speech Using Convolutional Sequence Learning, filed Aug. 8, 2018, Oct. 6, 2020.
U.S. Appl. No. 16/277,919, U.S. Pat. No. 10,872,596, Wei Ping, Systems and Methods for Parallel Wave Generation in End-To-End Text-To-Speech, filed Feb. 15, 2019, Dec. 22, 2020.
U.S. Appl. No. 17/129,752, Wei Ping, Waveform Generation Using End-To-End Text-To-Waveform System, Allowed.
U.S. Appl. No. 16/654,955, U.S. Pat. No. 11,017,761, Kainan Peng, Parallel Neural Text-To-Speech. filed Oct. 16, 2019, May 25, 2021.
Non-Final Office Action dated Aug. 30, 2022, in U.S. Appl. No. 17/061,433 (10 pgs).
Corrected Notice of Allowability, dated Jul. 20, 2022, in related U.S. Appl. No. 17/129,752. (4 pgs).
Corrected Notice of Allowability, dated Aug. 22, 2022, in related U.S. Appl. No. 17/129,752. (6 pgs).
Corrected Notice of Allowability, dated Sep. 23, 2022, in related U.S. Appl. No. 17/129,752. (6 pgs).
Abadi et al., "TensorFlow: Large-scale machine learning on heterogeneous systems," Retrieved <URL:http://download.tensorflow.org/paper/whitepaper2015.pdf>, 2015. (19pgs).
Amodei et al., "Deep speech 2: End-to-End speech recognition in English and Mandarin," arXiv preprint arXiv:1512.02595, 2015. (28pgs).
Boersma et al.,"PRAAT, a system for doing phonetics by computer," Glot international, vol. 5, No. 9/10, Nov./Dec. 2001 (341-347). (7pgs).
Bradbury et al.,"Quasi-recurrent neural networks," arXiv preprint arXiv: 1611.01576, 2016. (11 pgs).
Chung et al. "Empirical evaluation of gated recurrent neural networks on sequence modeling," arXiv preprint arXiv:1412.3555, 2014. (9 pgs).
Diamos et al., "Persistent RNNS: Stashing recurrent weights On-Chip," In Proceedings of The 33rd International Conference on Machine Learning, 2016. (10pgs).
Dukhan et al.,"PeachPy meets Opcodes: direct machine code generation from Python,"In Proceedings of the 5th Workshop on Python for High-Performance and Scientific Computing, 2015. (2 pgs).
Graves et al.,"Connectionist temporal classification :Labelli ng unsegmented sequence data with recurrent neural networks,"In Proc of the 23rd Int'l Con on Machine Learning,.
Notice of Allowance and Fee(s) Due, dated Jan. 31, 2023, in U.S. Appl. No. 17/061,433 (9 pgs).

* cited by examiner

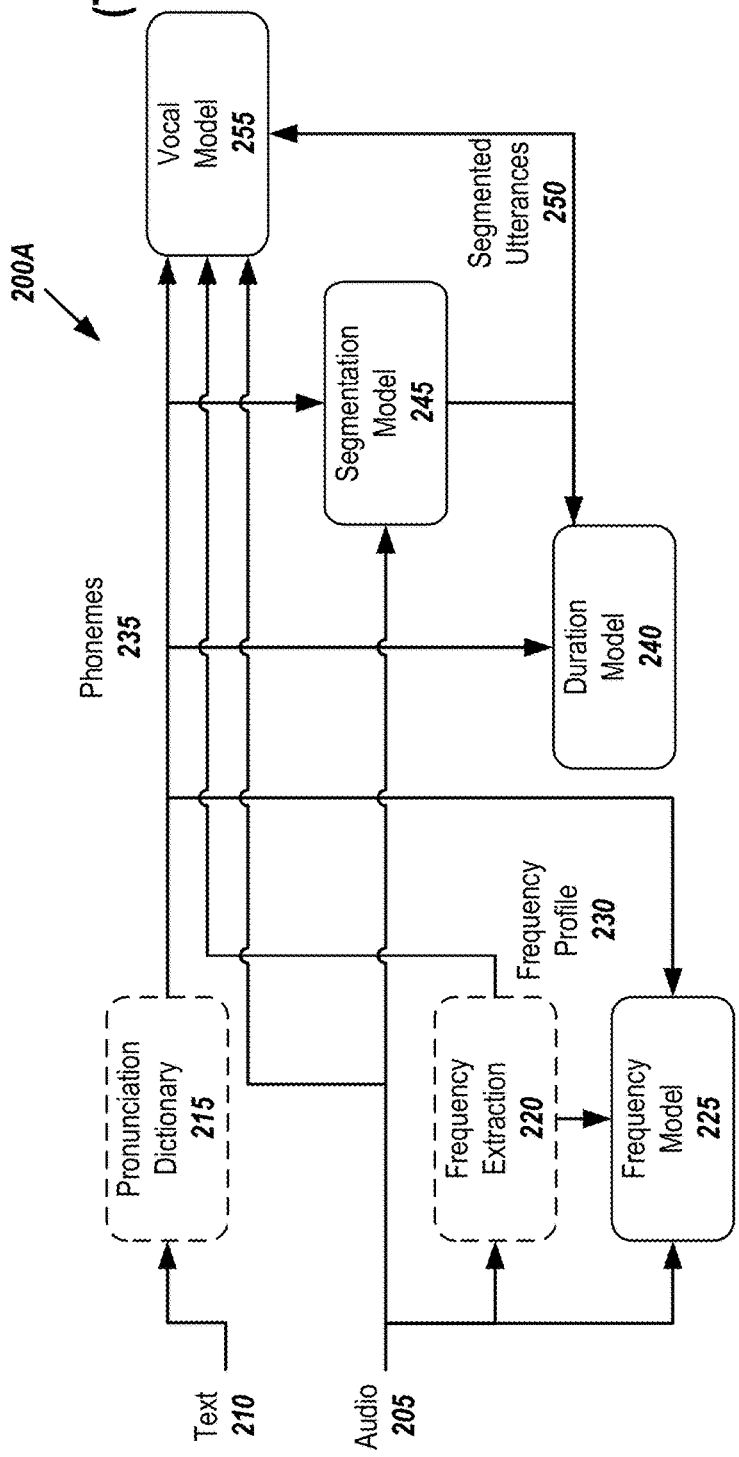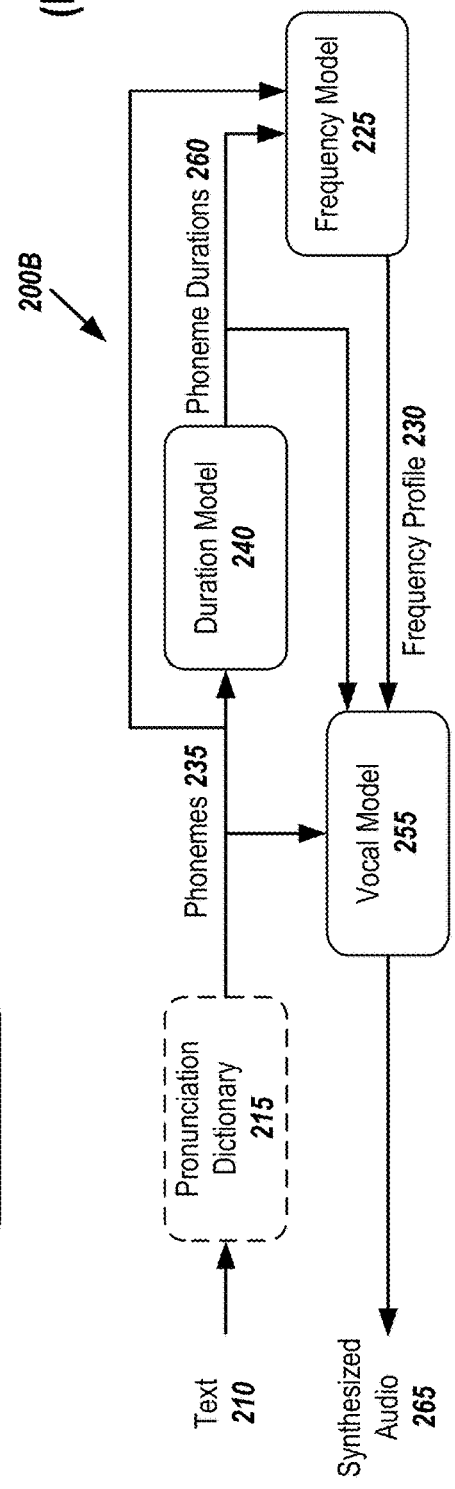

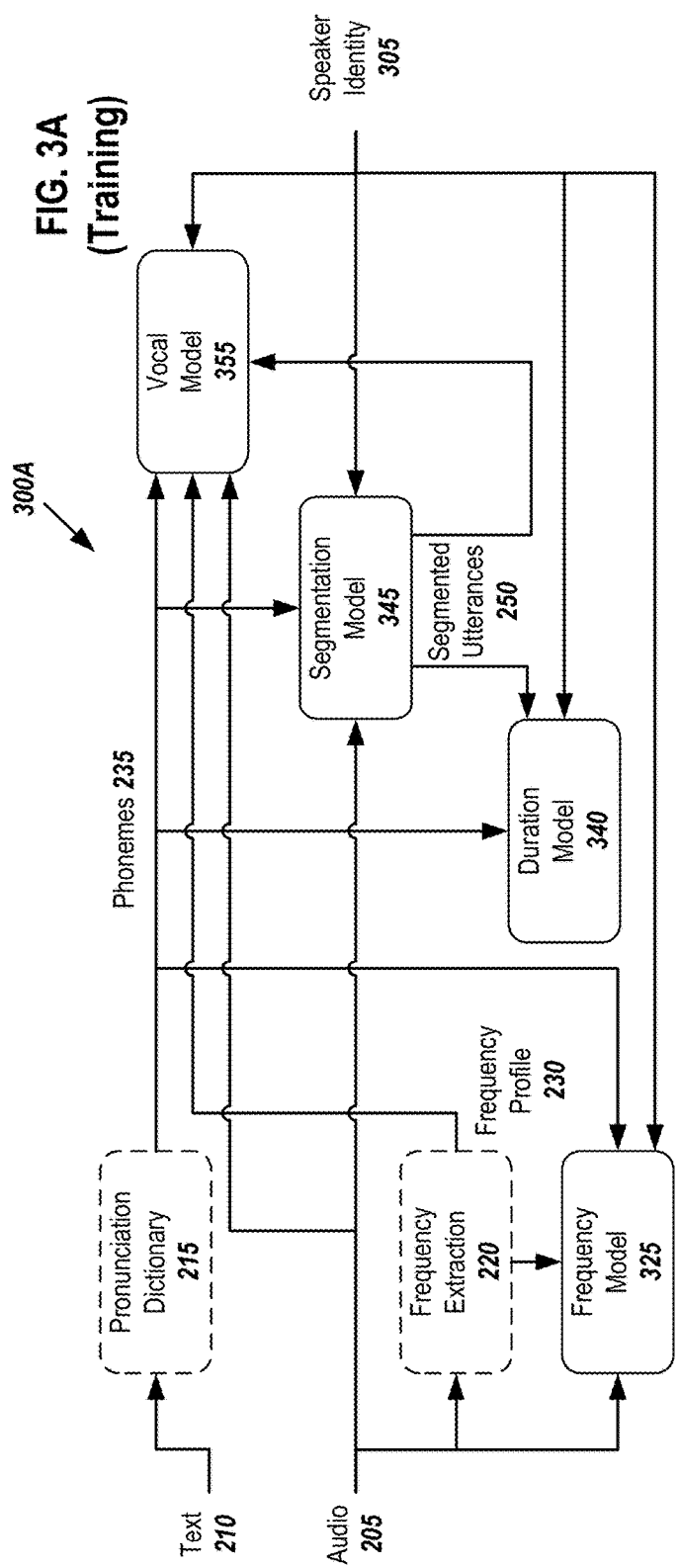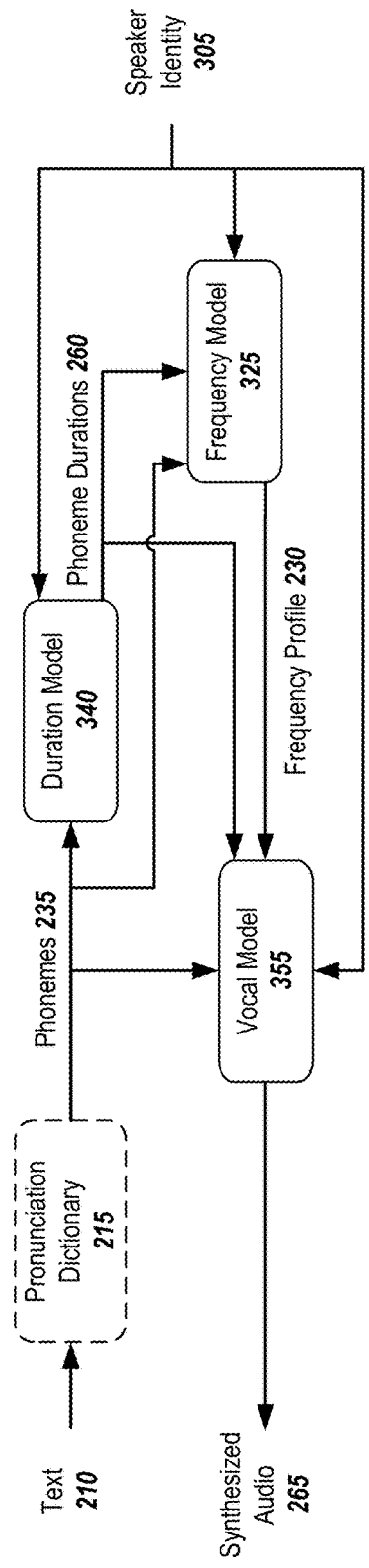

DURATION MODEL

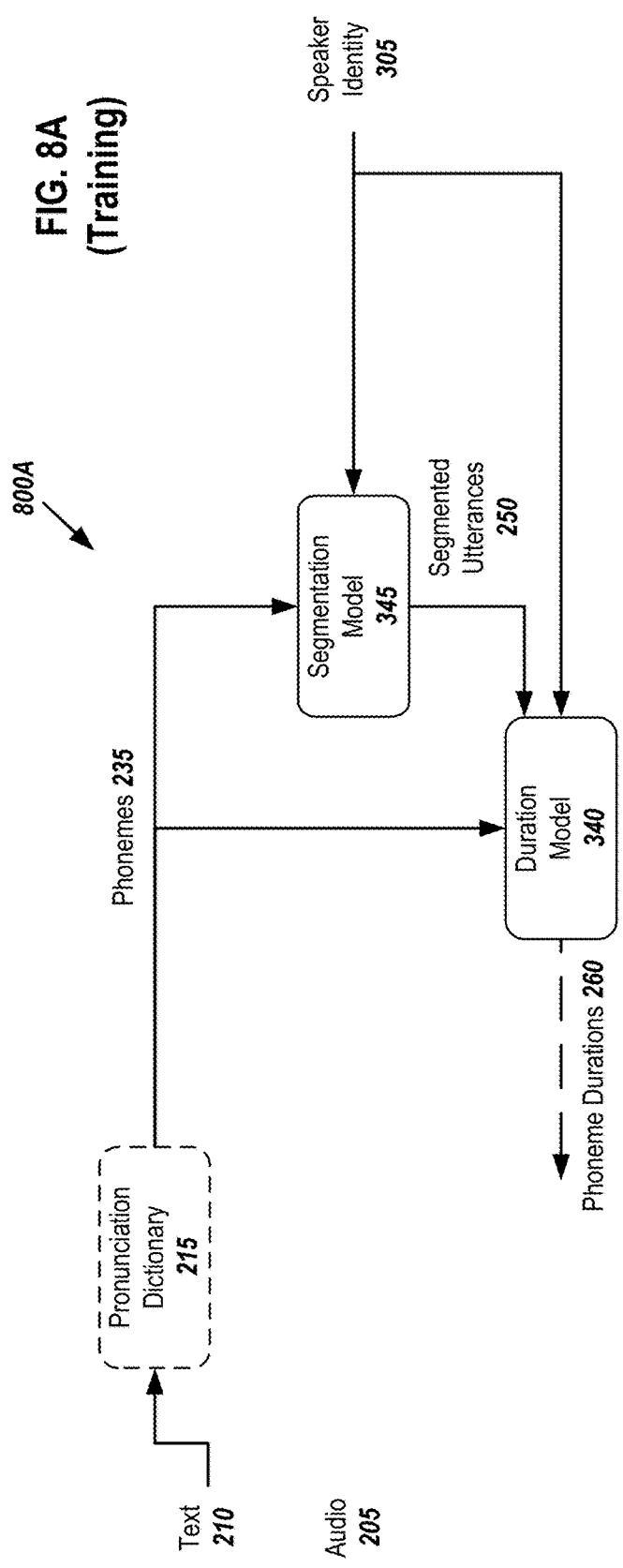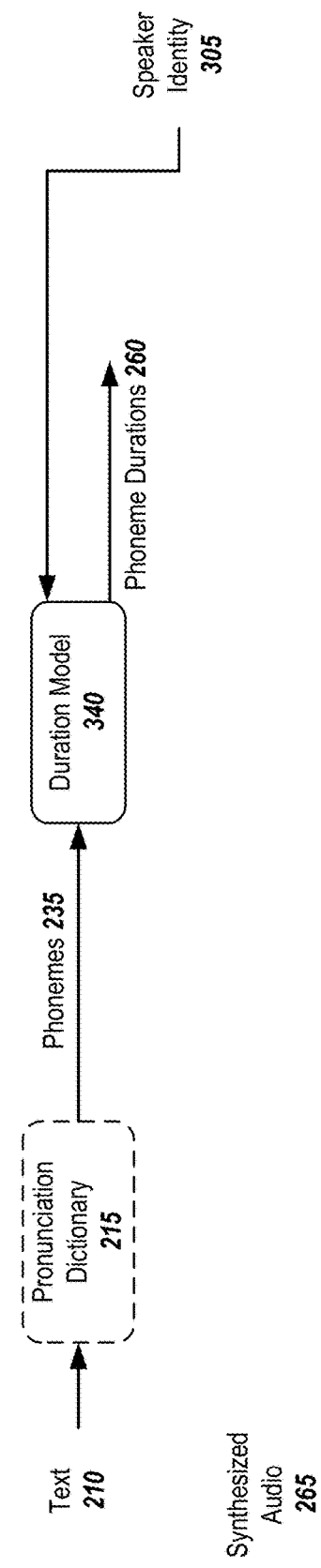

900

Use the training phonemes, the speaker identifier that identifies a speaker for each utterance, and the segmented speech utterances from the trained segmentation model to train a duration model to output phoneme durations ⟋ 905

FIG. 9

FREQUENCY MODEL

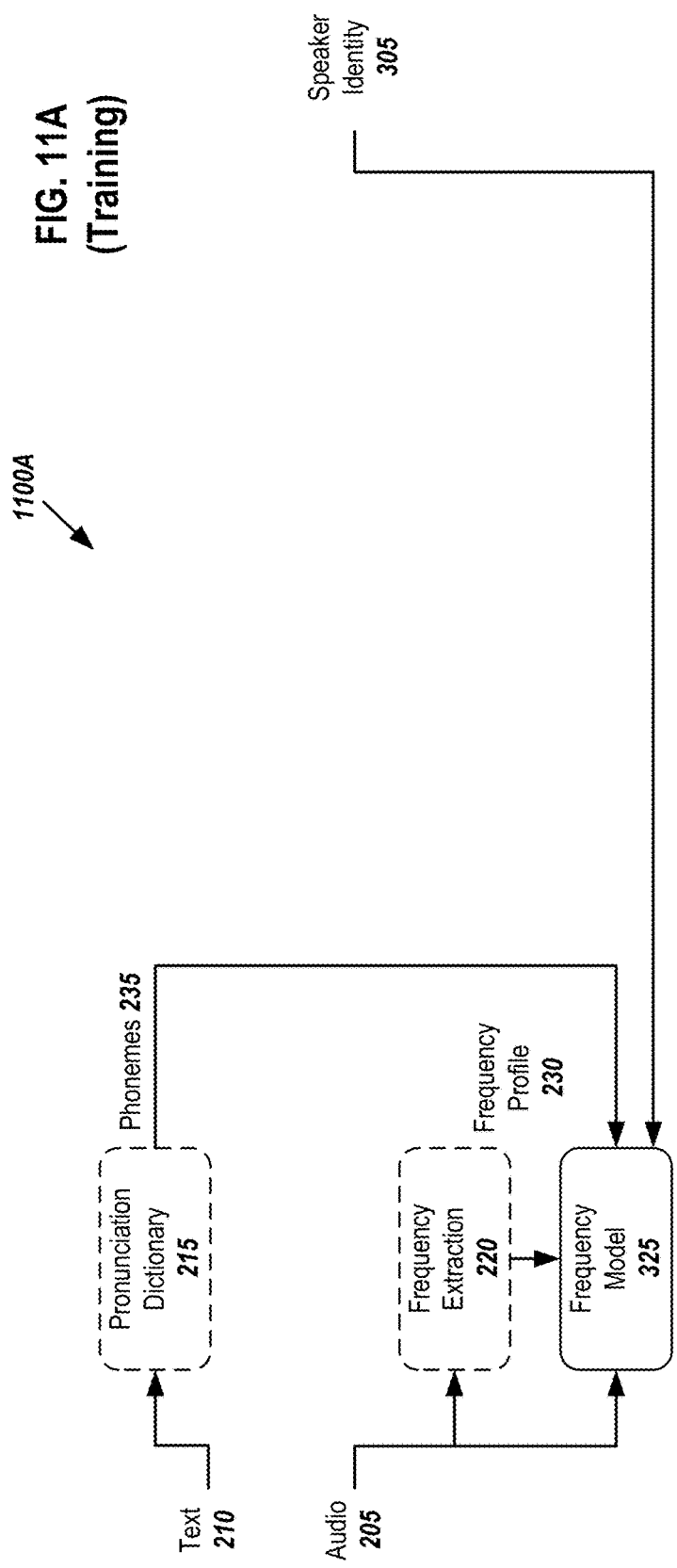
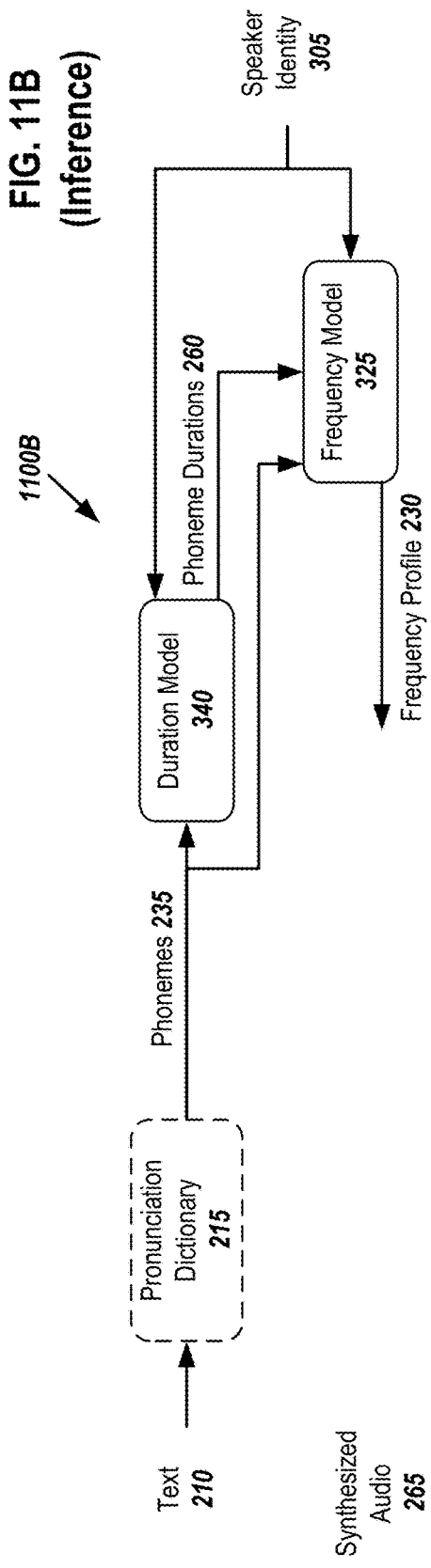

*1200*

```
┌─────────────────────────────────────────────────────┐
│ Extract frequency profiles for the training speech  │
│ utterances, in which a frequency profile comprises  │──⌒ 1205
│ voicedness and time-dependent fundamental           │
│ frequency, F0                                       │
└─────────────────────────────────────────────────────┘
                           │
                           ▼
┌─────────────────────────────────────────────────────┐
│ Use the training phonemes, the audio of training    │
│ speech utterances, the speaker identifier that      │
│ identifies the speaker for each utterance, and the  │──⌒ 1210
│ extracted frequency profiles for the training       │
│ speech utterances to train a frequency model to     │
│ output one or more frequency profiles               │
└─────────────────────────────────────────────────────┘
```

FIG. 12

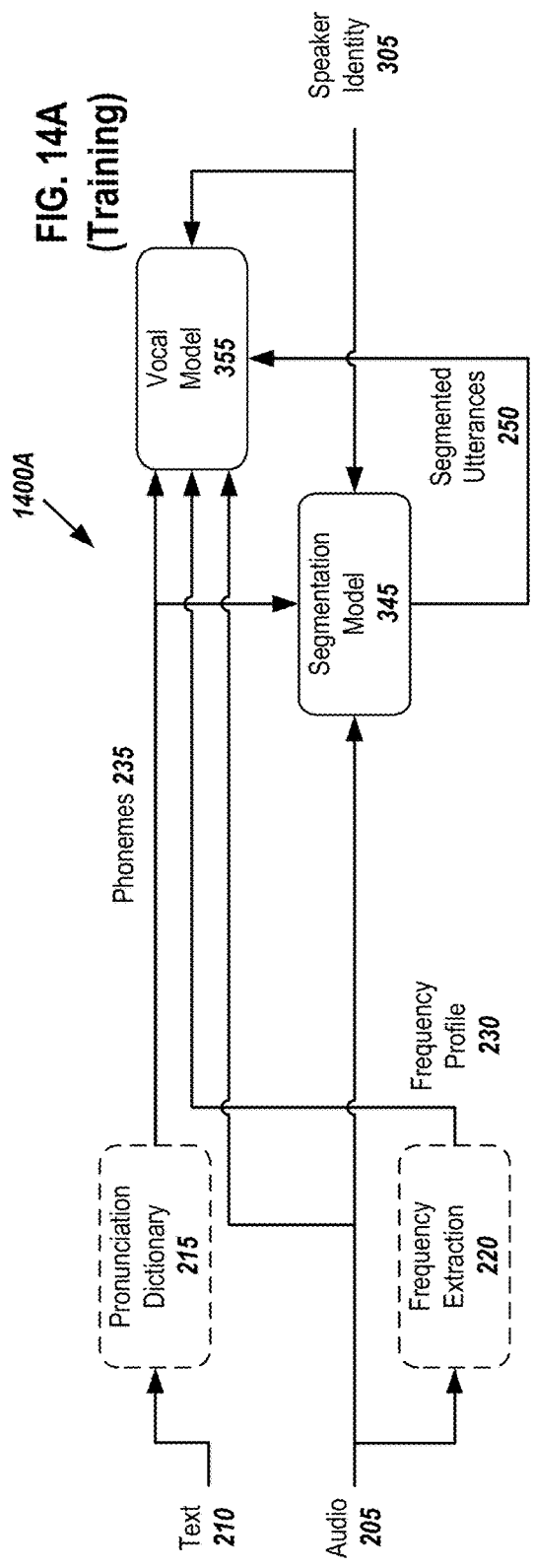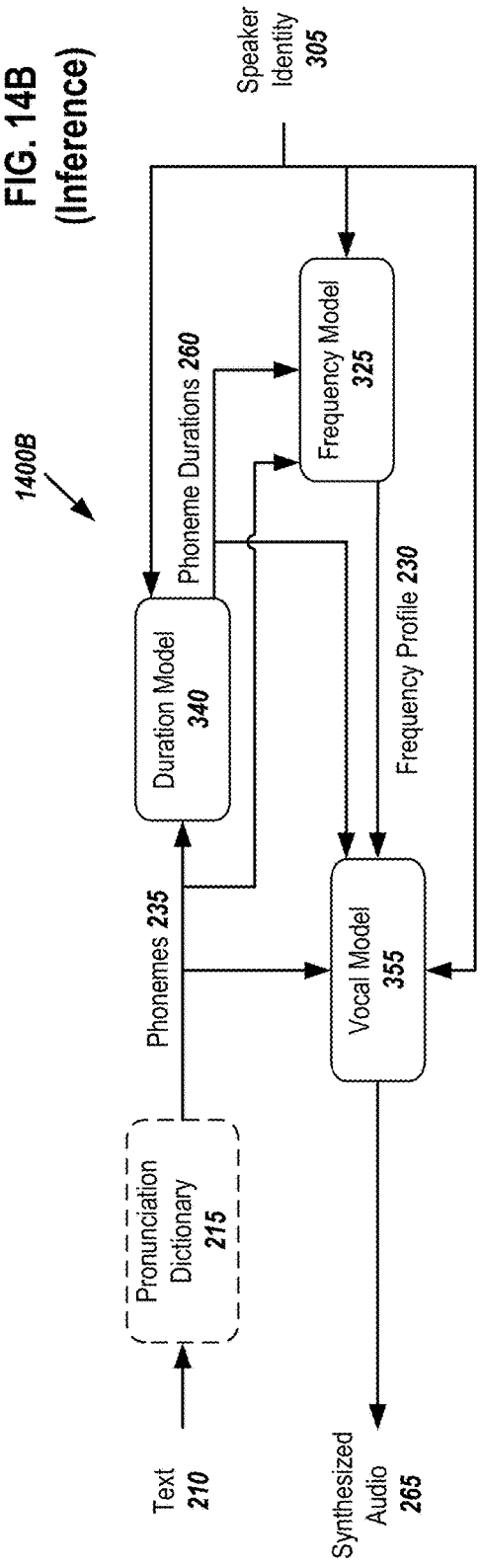

1500

Use the training phonemes, the audio of training speech utterances, the speaker identifier that identifies the speaker for each utterance, the segmented speech utterances, and one or more frequency profiles of the phonemes to train a vocal model to output a signal representing synthesized human speech ⟋ 1505

FIG. 15

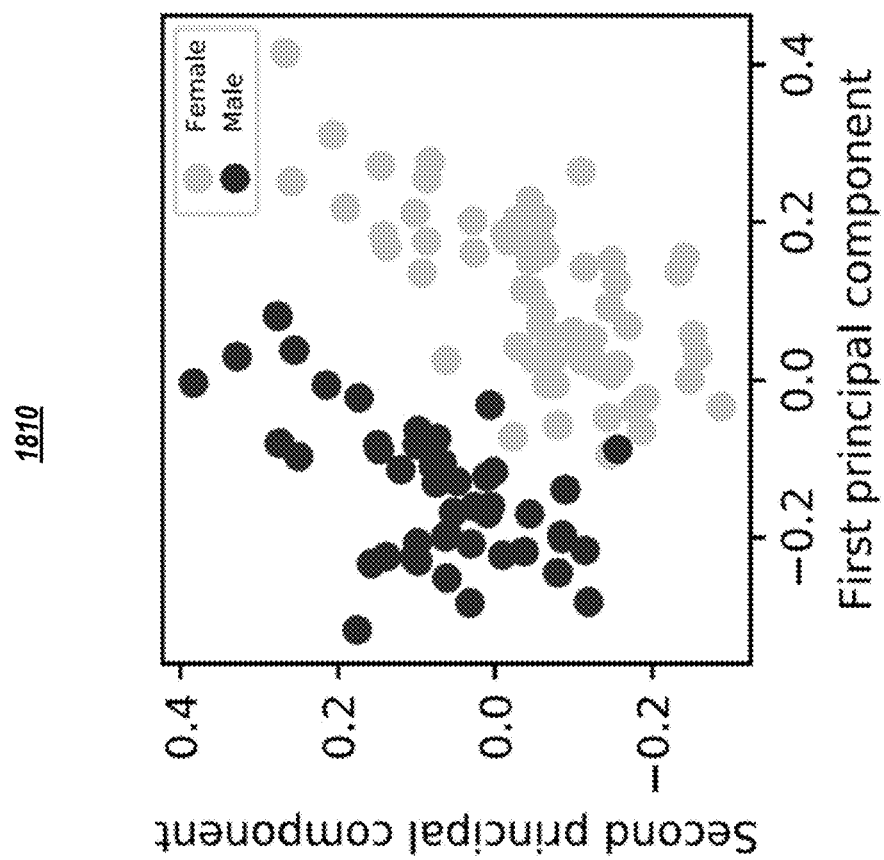
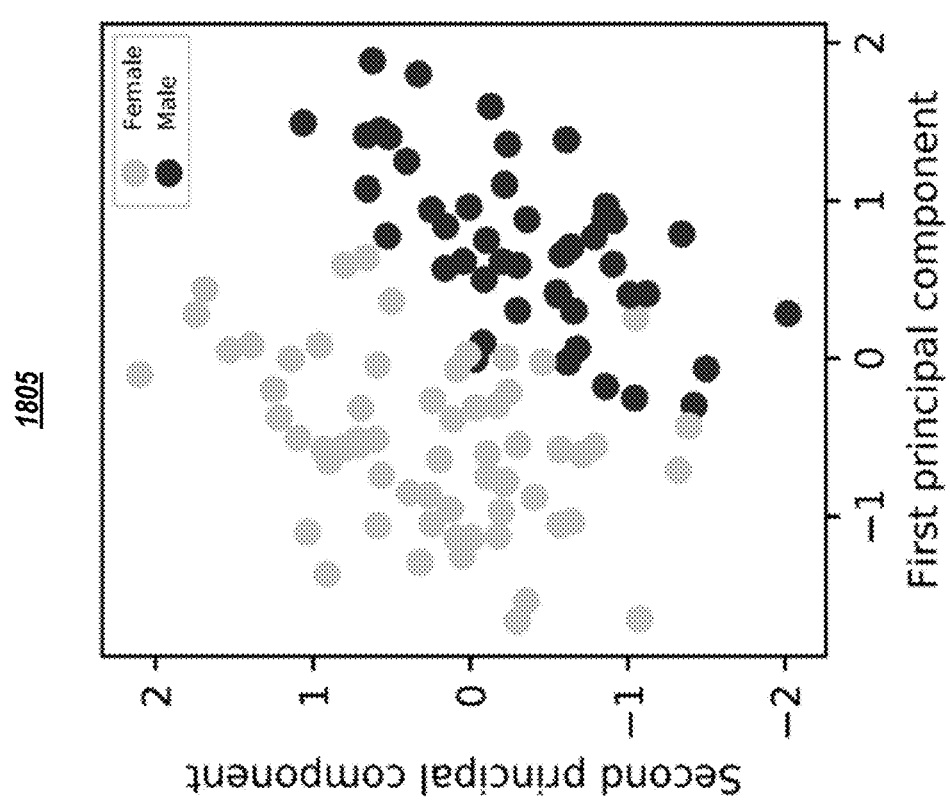
FIG. 18

MULTI-SPEAKER NEURAL TEXT-TO-SPEECH

CROSS-REFERENCE To RELATED APPLICATIONS

This patent application is a divisional of and claims the priority benefit of co-pending and commonly-owned U.S. patent application Ser. No. 15/974,397 (Docket No. 28888-2144), filed on 8 May 2018, entitled "SYSTEMS AND METHODS FOR MULTI-SPEAKER NEURAL TEXT-TO-SPEECH," and listing Sercan O. Arik, Gregory Diamos, Andrew Gibiansky, John Miller, Kainan Peng, Wei Ping, Jonathan Raiman, and Yanqi Zhou as inventors, which claims the priority benefit under 35 USC § 119(e) to U.S. Provisional Patent Application No. 62/508,579 (Docket No. 28888-2144P), filed on 19 May 2017, entitled "SYSTEMS AND METHODS FOR MULTI-SPEAKER NEURAL TEXT-TO-SPEECH," and listing Andrew Gibiansky, Sercan O. Arik, John Miller, Jonathan Raiman, Kainan Peng, Wei Ping, Gregory Diamos, and Yanqi Zhou as inventors. Each of the aforementioned patent documents is incorporated by reference herein in its entirety and for all purposes.

BACKGROUND

Technical Field

The present disclosure relates generally to systems and methods for machine learning that can provide improved computer performance, features, and uses. More particularly, the present disclosure relates to systems and methods for improved automation of text-to-speech conversion.

Background

Artificial speech synthesis, commonly known as text-to-speech (TTS), has a variety of applications in technology interfaces, accessibility, media, and entertainment. Fundamentally, it allows, among other uses, human-technology interactions without requiring visual interfaces.

Due to its complexity, developing TTS systems can be very labor intensive and difficult. Most TTS systems are built with a single speaker voice, and multiple speaker voices are provided by having distinct speech databases or model parameters. As a result, developing a TTS system with support for multiple voices requires much more data and development effort than a system which only supports a single voice.

Accordingly, what is needed are improved systems and methods that create high quality text-to-speech systems using neural speech synthesis models that can learn effectively from small amounts of data spread among hundreds of different speakers.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

FIG. ("FIG.") 1 depicts a diagram of an example inference system according to embodiments of the present document.

FIG. 2A graphically depicts a diagram for training procedure for a single-speaker Deep Voice 2 embodiment, according to embodiments of the present document.

FIG. 2B graphically depicts a diagram for inference/deployment a single-speaker Deep Voice 2 embodiment, according to embodiments of the present document.

FIG. 3A graphically depicts a diagram for training procedure for a multi-speaker Deep Voice 2 embodiment, according to embodiments of the present document FIG. 3B graphically depicts a diagram for inference/deployment of a multi-speaker Deep Voice 2 embodiment, according to embodiments of the present document.

FIG. 8A depicts graphically depicts a simplified diagram for training of a multi-speaker duration model, according to embodiments of the present document.

FIG. 8B is a simplified graphical depiction of a trained multi-speaker duration model's role during deployment/inference, according to embodiments of the present document.

FIG. 9 depict a method for training a multi-speaker duration model, according to embodiments of the present document.

FIG. 11A depicts graphically depicts a simplified diagram for training of a multi-speaker frequency model, according to embodiments of the present document.

FIG. 11B is a simplified graphical depiction of a trained multi-speaker frequency model's role during deployment/inference, according to embodiments of the present document.

FIG. 12 depict a method for training a multi-speaker frequency model, according to embodiments of the present document.

FIG. 14A depicts graphically depicts a simplified diagram for training of a multi-speaker vocal model, according to embodiments of the present document.

FIG. 14B is a simplified graphical depiction of a trained multi-speaker vocal model's role during deployment/inference, according to embodiments of the present document.

FIG. 15 depict a method for training a multi-speaker vocal model, according to embodiments of the present document.

FIG. 18 depicts principal components of the learned speaker embeddings of an 80-layer vocal model embodiment and for a character-to-spectrogram model embodiment for VCTK dataset, according to embodiments of the present document.

DETAILED DESCRIPTION OF EMBODIMENTS

Figure 1:
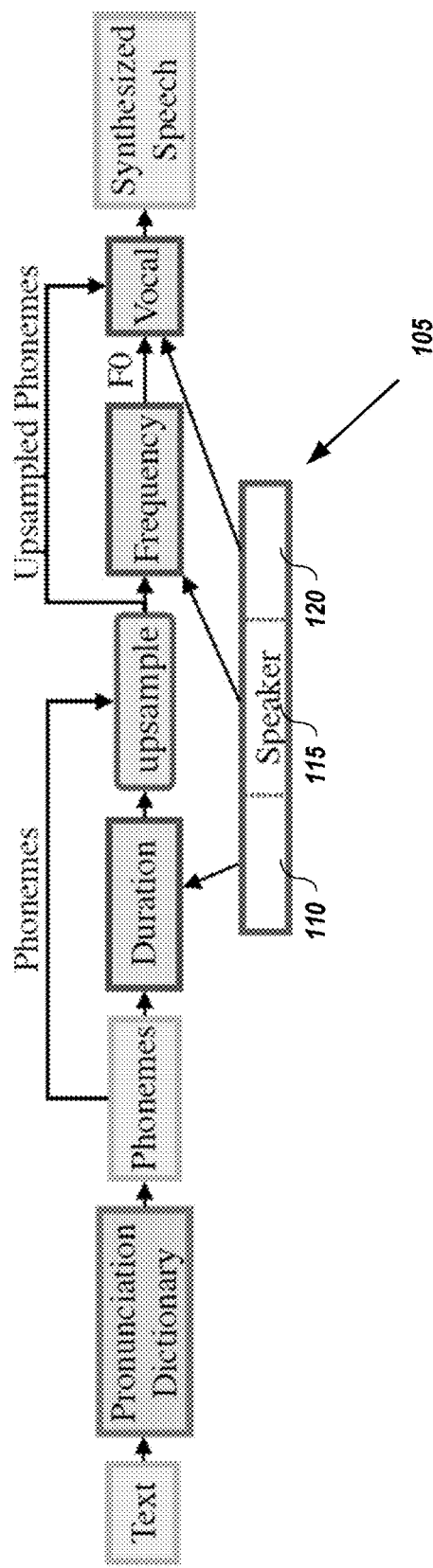

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

It shall be noted that these experiments and results are provided by way of illustration and were performed under specific conditions using a specific embodiment or embodiments; accordingly, neither these experiments nor their results shall be used to limit the scope of the disclosure of the current patent document.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

1. Introduction

Artificial speech synthesis, commonly known as text-to-speech (TTS), has a variety of applications in technology interfaces, accessibility, media, and entertainment. Most TTS systems are built with a single speaker voice, and multiple speaker voices are provided by having distinct speech databases or model parameters. As a result, developing a TTS system with support for multiple voices requires much more data and development effort than a system which only supports a single voice.

Presented herein, it is shown that all-neural multi-speaker TTS systems, which share the vast majority of parameters between different voices, can be built. It is also shown that not only can embodiments of a single model generate speech from multiple different voices, but also that significantly less data is required per speaker than when training single-speaker systems.

Presented herein are architecture embodiments (which may be generally referred to herein for convenience as Deep Voice 2 or DV2) and which may be considered as novel architectures related to embodiments disclosed in commonly-assigned U.S. patent application Ser. No. 15/882,926 (Docket No. 28888-2105), filed on 29 Jan. 2018, entitled "SYSTEMS AND METHODS FOR REAL-TIME NEURAL TEXT-TO-SPEECH," and U.S. Prov. Pat. App. No. 62/463,482 (Docket No. 28888-2105P), filed on 24 Feb. 2017, entitled "SYSTEMS AND METHODS FOR REAL-TIME NEURAL TEXT-TO-SPEECH," each of the aforementioned patent documents is incorporated by reference herein in its entirety (which disclosures may be referred to, for convenience, as "Deep Voice 1"). In one or more embodiments, a WaveNet-based (van der Oord, Aaron; Dieleman, Sander; Zen, Heiga; Simonyan, Karen; Vinyals, Oriol; Graves, Alex; Kalchbrenner, Nal; Senior, Andrew; Kavukcuoglu, Koray. "WaveNet: A Generative Model for Raw Audio," arXiv:1609.03499, 2016, which is available at arxiv.org/pdf/1609.03499.pdf (2016) and is incorporated by reference herein in its entirety) spectrogram-to-audio neural vocoder is introduced; and, in one or more embodiments, it may be used with Tacotron (Y. Wang, R. Skerry-Ryan, D. Stanton, Y. Wu, R. J. Weiss, N. Jaitly, Z. Yang, Y. Xiao, Z. Chen, S. Bengio, et al. Tacotron: Towards end-to-end speech synthesis. In Interspeech, 2017, which is incorporated by reference herein in its entirety) as a replacement for Griffin-Lim audio generation. Using these two single-speaker models as a baseline, embodiments of multi-speaker neural speech synthesis were created by incorporating trainable speaker embeddings into embodiments of Deep Voice 2 and Tacotron.

Section 2 discusses related work and some of the aspects in the current patent document that are distinct from prior work. In Section 3, certain Deep Voice 2 embodiments are presented and some of the novel differences from Deep Voice 1 are highlighted. Section 4 explains embodiments of the speaker embedding technique for neural TTS models and shows multi-speaker variants of the Deep Voice 2 and Tacotron architectures. Section 5.A quantifies the improvement for single speaker TTS through a mean opinion score (MOS) evaluation and Section 5.B presents the synthesized audio quality of embodiments of multi-speaker Deep Voice 2 and Tacotron via both MOS evaluation and a multi-speaker discriminator accuracy metric. Section 6 provides a discussion of some of the results.

2. Related Work

Discussed herein are related work, starting from single-speaker neural speech synthesis and moving on to multi-speaker speech synthesis and metrics for generative model quality.

With regards to single-speaker speech synthesis, deep learning has been used for a variety of subcomponents, including duration prediction, fundamental frequency prediction, acoustic modeling, and more recently autoregressive sample-by-sample audio waveform generation. Embodiments of the present document build upon recent work in entirely neural TTS systems, including Deep Voice 1, Tacotron, and Char2Wav (J. Sotelo, S. Mehri, K. Kumar, J. F. Santos, K. Kastner, A. Courville, and Y. Bengio, "Char2Wav: End-to-End Speech Synthesis." In ICLR2017 workshop submission (2017), which is incorporated by reference herein in its entirety). While these works focus on building single-speaker TTS systems, embodiment presented herein focus on extending neural TTS systems to handle multiple speakers with less data per speaker.

Others have attempted a multi-speaker TTS system. For instance, in traditional Hidden Markov Model (HMM)-based TTS synthesis, an average voice model is trained using multiple speakers' data, and then is adapted to different speakers. Deep Neural Network (DNN)-based systems have also been used to build average voice models, with i-vectors representing the speakers as additional inputs and separate output layers for each target speaker. Similarly, some used a shared hidden representation among different speakers with speaker-dependent output layers predicting vocoder parameters (e.g., line spectral pairs, aperiodicity parameters, etc.). For further context, others empirically studied DNN-based multi-speaker modeling. More recently, speaker adaptation has been tackled with generative adversarial networks (GANs), but further work is necessary before adversarial training methods lead to acceptable quality samples.

Unlike these prior approaches, embodiments herein instead use trainable speaker embeddings for multi-speaker TTS, which is a novel technique. Unlike prior work which depends on i-vectors, the speaker embeddings used in one or more embodiments are trained jointly with the rest of the model from scratch using backpropagation, and thus can directly learn the features relevant to the speech synthesis task. In addition, embodiments do not rely on per-speaker output layers or average voice modeling, which leads to higher-quality synthesized samples and lower data requirements, as there are fewer unique parameters per speaker to learn.

To evaluate the distinctiveness of the samples in an automated way, the classification accuracy of a speaker discriminator was used. Similar metrics such as an "Inception score" have been used for quantitative quality evaluations of GANs for image synthesis. Speaker discriminator models have been studied with both traditional GMM-based methods and more recently with deep learning approaches.

3. Single-Speaker Deep Voice 2 Embodiments

In this section, embodiments of a neural TTS system, which may be generally referred to as Deep Voice 2, are presented. In one or more embodiments, the general overall structure of embodiments of the Deep Voice 1 system (referenced above) were kept, as depicted in FIG. 1.

FIG. 1 depicts a diagram of an example inference system 100, according to embodiments of the present document. As shown in the embodiment depicted in FIG. 1, the stages are: first, text-phonemes conversion; second, predict phoneme durations; third, upsample and generate fundamental frequency ($F_0$) profile; finally, feed $F_0$ and phonemes to a vocal model to a signal representing a synthesized speech of the input text. Also depicted in FIG. 1 is a speaker identifier 105 which is used to provide multi-speaker capability. In one or more embodiments, the speaker identifier may be a vector 105 that comprises three speaker identifier embedding vectors 110, 115, and 120, which are used with the duration model, frequency model, and vocal model, respectively. In one or more embodiments, the speaker identifier embedding vectors are trained separately. One of the motivations for presenting an improved single-speaker model is to use it as a starting point for high-quality multi-speaker model embodiments.

One major difference between embodiments of Deep Voice 2 and embodiments of Deep Voice 1 is the separation of the phoneme duration and frequency models. A typical Deep Voice 1 embodiment has a single model to jointly predict phoneme duration and frequency profile (voicedness and time-dependent fundamental frequency, $F_0$). In one or more Deep Voice 2 embodiments, the phoneme durations are predicted first and then are used as inputs to the frequency model.

For convenience, FIG. 2A graphically depicts a system diagram for training procedure for a single-speaker Deep Voice 2 embodiment, according to embodiments of the present document, and FIG. 2B graphically depicts a system diagram for inference/deployment of a single-speaker Deep Voice 2 embodiment, according to embodiments of the present document.

As shown in FIG. 2A, training audio 210 and its corresponding transcription 210 are inputs used to train the various component models of the system 200A (e.g., frequency model 225, segmentation model 245, duration model 240, and vocal model 255). From the text 210, phonemes 235 are extracted using, in one or more embodiments, a pronunciation dictionary 215. In one or more embodiments, a pronunciation dictionary 215 may be substituted by a grapheme-to-phoneme model as in some Deep Voice 1 embodiments, to adapt for unseen words in the pronunciation dictionary. In one or more embodiments, the phonemes include phoneme with stresses, when applicable to the phoneme.

In one or more embodiments, for frequency extraction 220 during training, a fundamental frequency and voicedness estimation algorithm, such as Praat (a free computer software package for the scientific analysis of speech in phonetics, which was designed and developed by Paul Boersma and David Weenink of the Institute of Phonetic Sciences—University of Amsterdam), may be used, although it should be noted that other fundamental frequency and voicedness estimation algorithm or algorithms may be used. In one or more embodiments, the output is a frequency profile 230 for the audio. In one or more embodiments, the input audio 205, frequency profile 230, and phonemes 235 are used to train a frequency model 225 that produces frequencies profiles.

In one or more embodiments, the phonemes 235 and audio 205 are used to train a segmentation model 245 that produces segmented utterance 250. In one or more embodiments, the phonemes 235 and segmented utterances 250 are used to train a duration model 240 that indicates the duration of the phonemes. In one or more embodiments, the vocal model 255 is trained using the input audio 205 and the corresponding frequency profile 203, phonemes 235, and segmented utterances 250 to produce a signal representing synthesized human speech of the written text 210.

FIG. 2B graphically depicts a system diagram 200B for inference/deployment a single-speaker Deep Voice 2 embodiment, according to embodiments of the present document. In the text-to-speech (TTS) system 200B synthesizes human speech from an input text 210 by converting the input text to phonemes 235 and inputting the phonemes into a trained duration model 240 and into a trained fundamental frequency model 225 that outputs phoneme durations and fundamental frequency profiles, respectively. In one or more embodiments, the trained vocal model 255 uses the phonemes 235, phoneme durations 260, and frequency profiles 230 to generate a signal representing synthesized human speech of the input text 210. The intermediate evaluation metrics for Deep Voice 2 model embodiments are compared to their Deep Voice 1 embodiment counterparts in Table 1.

TABLE 1

Comparison of segmentation, duration, and frequency model embodiments for Deep Voice 1 embodiments and Deep Voice 2 embodiments, both trained with the same single-speaker data set and evaluated as described in Deep Voice 1.

| Model | Evaluation metric | Deep Voice 1 | Deep Voice 2 |
|---|---|---|---|
| Segmentation | Phoneme pair error rate | 7% | 0.1% |
| Duration | Mean absolute error | 38.0 ms | 17.5 ms |
| Frequency | Mean absolute error | 29.4 Hz | 24.5 Hz |

In the following subsequent subsections, embodiments of the models used in Deep Voice 2 are presented. In one or more embodiments, all models are trained separately, and the hyperparameters are specified in Appendix A. A quantitative comparison of Deep Voice 1 embodiments and Deep Voice 2 embodiments is also presented herein.

A. Segmentation Model Embodiments

Estimation of phoneme locations may be treated as an unsupervised learning problem in Deep Voice 2 embodiments. In one or more embodiments, the segmentation model is a convolutional-recurrent architecture with connectionist temporal classification (CTC) loss applied to classify phoneme pairs, which are then used to extract the boundaries between them. In one or more embodiments, some architecture changes in Deep Voice 2 embodiments are the addition of batch normalization and residual connections in the convolutional layers. Specifically, a Deep Voice 1 segmentation model embodiment computes the output of each layer as:

$$h^{(l)} = \text{relu}(W^{(l)} * h^{(l-1)} + b^{(l)}) \quad (1)$$

where $h^{(l)}$ is the output of the lth layer, $W^{(l)}$ are the convolution filterbank, $b^{(l)}$ is the bias vector, and * is the convolution operator. In contrast, in one or more embodiments, the Deep Voice 2 segmentation model layers instead compute:

$$h^{(l)} = \text{relu}(h^{(l-1)} + \text{BN}(W^{(l)} * h^{(l-1)})) \quad (2)$$

where BN represents batch normalization. In addition, it was found that the segmentation model may make mistakes for boundaries between silence phonemes and other phonemes, which can significantly reduce the segmentation accuracy on some datasets. Accordingly, in one or more embodiments, a post-processing step is introduced to correct these potential mistakes: whenever the segmentation model decodes a silence boundary, the location of the boundary is adjusted with a silence detection heuristic. For example, in one or more embodiments, the smoothed normalized audio power is computed as $p[n] = (x[n]^2/x_{max}^2) * g[n]$, where $x[n]$ is the audio signal, $g[n]$ is the impulse response of a Gaussian filter, $x_{max}$ is the maximum value of $x[n]$, and * is a one-dimensional convolution operation. In one or more embodiments, the silence phoneme boundaries are assigned when $p[n]$ exceeds a fixed threshold. In one or more embodiments, the optimal parameter values for the Gaussian filter and the threshold depend on the dataset and audio sampling rate.

B. Duration Model Embodiments

In one or more Deep Voice 2 embodiments, instead of predicting a continuous-valued duration, duration prediction is formulated as a sequence labeling problem. The phoneme duration may be discretized into log-scaled buckets, and each input phoneme may be assigned to the bucket label corresponding to its duration. In one or more embodiments, the sequence is modelled with a conditional random field (CRF) loss function with pairwise potentials at output layer. In one or more embodiments, during inference, discretized durations may be decoded from the CRF using the Viterbi forward-backward algorithm. In one or more embodiments, it was found that quantizing the duration prediction and introducing the pairwise dependence implied by the CRF improved synthesis quality.

C. Frequency Model Embodiments

In one or more embodiments, after decoding from the duration model, the predicted phoneme durations are upsampled from a per-phoneme input to a per-frame input for the frequency model. In one or more embodiments, each frame is ensured to be 10 milliseconds. For instance, if a phoneme lasts 20 milliseconds, the input features corresponding to that phoneme will be repeated in two frames. In one or more embodiments, phonemes that last less than 10 milliseconds are extended to be a single frame.

Deep Voice 2 frequency model embodiments comprise multiple layers: firstly, bidirectional gated recurrent unit (GRU) layers generate hidden states from the input features. From these hidden states, an affine projection followed by a sigmoid nonlinearity may be used to produce the probability that each frame is voiced. In addition, the hidden states may be used to make two separate normalized fundamental frequency ($F_0$) predictions. In one or more embodiments, the first prediction, $f_{GRU}$, is made with a single-layer bidirectional GRU followed by an affine projection. In one or more embodiments, the second prediction, $f_{conv}$, is made by adding up the contributions of multiple convolutions with varying convolution widths and a single output channel. Finally, the hidden state may be used with an affine projection and a sigmoid nonlinearity to predict a mixture ratio ω, which may be used to weigh the two normalized frequency predictions and combine them into:

$$f = \omega \cdot f_{GRU} + (1-\omega) \cdot f_{conv} \quad (3)$$

The normalized prediction f may then be converted to the true frequency $F_0$ prediction via:

$$F_0 = \mu_{F_0} + \sigma_{F_0} \cdot f \quad (4)$$

where $\mu_{F_0}$ and $\sigma_{F_0}$ are, respectively, the mean and standard deviation of $F_0$ for the speaker the model is trained on. In one or more embodiments, it was found that predicting the fundamental frequency $F_0$ with a mixture of convolutions and a recurrent layer performs better than predicting with either one individually. This may be attributed to the hypothesis that including the wide convolutions reduces the burden for the recurrent layers to maintain state over a large number of input frames, while processing the entire context information efficiently.

D. Vocal Model Embodiments

In one or more embodiments, a Deep Voice 2 vocal model may be based on a WaveNet architecture with a two-layer bidirectional quasi-recurrent neural network (QRNN) conditioning network, similar to embodiments of Deep Voice 1. However, in one or more embodiments, the 1×1 convolution between the gated tanh nonlinearity and the residual connection is removed. In addition, the same conditioner bias may be used for every layer of the WaveNet, instead of generating a separate bias for every layer as was done in one or more embodiments of Deep Voice 1. It was found that these changes reduce model size drastically (e.g., by a factor of ~7) and speed up inference significantly (e.g., by ~25%), while yielding no perceptual change in quality.

4. Multi-Speaker Model Embodiments with Trainable Speaker Embeddings

To synthesize speech from multiple speakers, in one or more embodiments, each of the models were augmented with a single low-dimensional speaker embedding vector per speaker. Unlike previous work, embodiments do not rely on per-speaker weight matrices or layers. Speaker-dependent parameters may be stored in a very low-dimensional vector and thus there is near-complete weight sharing between speakers. Embodiments use speaker embeddings to produce recurrent neural network (RNN) initial states, nonlinearity biases, and multiplicative gating factors, used throughout the networks.

In one or more embodiments, speaker embeddings are initialized randomly with a uniform distribution over [−0.1, 0.1] and trained jointly via backpropagation; each model has its own speaker embeddings.

To encourage each speaker's unique voice signature to influence the model, the speaker embeddings may be incorporated into multiple portions of the model. Empirically, it was found that, for embodiments, simply providing the speaker embeddings to the input layers does not work as well for any of the presented models besides the vocal model, possibly due to the high degree of residual connections present in the WaveNet and due to the difficulty of learning high-quality speaker embeddings. It was observed, in embodiments, that several patterns tend to yield high performance:

Site-Specific Speaker Embeddings: For every use site in the model architecture, transform the shared speaker embedding to the appropriate dimension and form through an affine projection and a nonlinearity.

Recurrent Initialization: Initialize the hidden states of recurrent layers with site-specific speaker embeddings.

Input Augmentation: Concatenate a site-specific speaker embedding to the input at every timestep of a recurrent layer.

Feature Gating: Multiply layer activations elementwise with a site-specific speaker embedding to render adaptable information flow. The feature gating may allow a model to learn the union of all necessary features while allowing speaker embeddings to determine which features are used for each speaker and how much influence these features will have on the activations.

FIG. 3A graphically depicts a diagram 300A for training procedure for a multi-speaker Deep Voice 2 embodiment, according to embodiments of the present document, and FIG. 3B graphically depicts a diagram 300B for inference/deployment of a multi-speaker Deep Voice 2 embodiment, according to embodiments of the present document. Note that for each diagram 300A and 300B, the addition of speaker identity 305 allows for multi-speaker input or capabilities for the duration model 340, the frequency model 325, the segmentation model 345, and the vocal model 355.

How speaker embeddings are used in each model embodiments is described next.

A. Multi-Speaker Deep Voice 2 Embodiments

In one or more embodiments, Deep Voice 2 models have separate speaker embeddings for each model; yet, they can be viewed as chunks of a larger speaker embedding, which are trained independently.

a) Segmentation Model Embodiments

Figure 4:
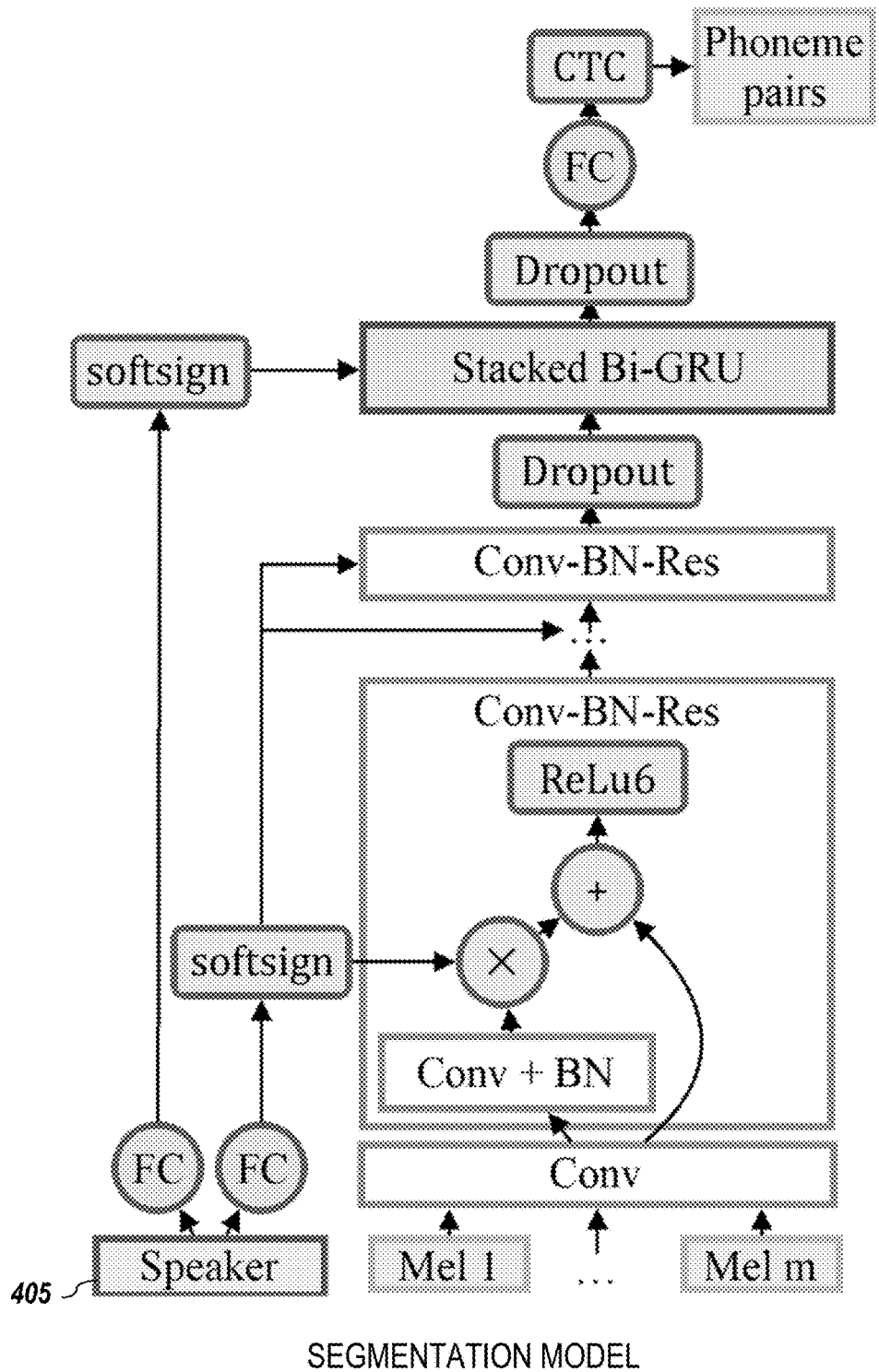
FIG. 4 graphically depict an architecture embodiment for a multi-speaker segmentation model, according to embodiments of the present document.

FIG. 4 graphically depict an architecture embodiment for a multi-speaker segmentation model, according to embodiments of the present document. Note that in the embodiment 400 depicted in FIG. 4, speaker embedding 405 is provided as an input to the segmentation model 400.

In multi-speaker segmentation model embodiments, feature gating may be used in the residual connections of the convolution layers. Instead of Eq. 2, the batch-normalized activations may be multiplied by a site-specific speaker embedding:

$$h^{(l)} = \mathrm{relu}(h^{(l-1)} + \mathrm{BN}(W * h^{(l-1)}) \cdot g_s) \quad (5)$$

where $g_s$ is a site-specific speaker embedding. In one or more embodiments, the same site-specific embedding may be shared for all the convolutional layers. In addition, in one or more embodiments, each of the recurrent layers is initialized with a second site specific embedding. Similarly, each layer may use the same site-specific embedding, rather than having a separate embedding per layer.

Figure 5:
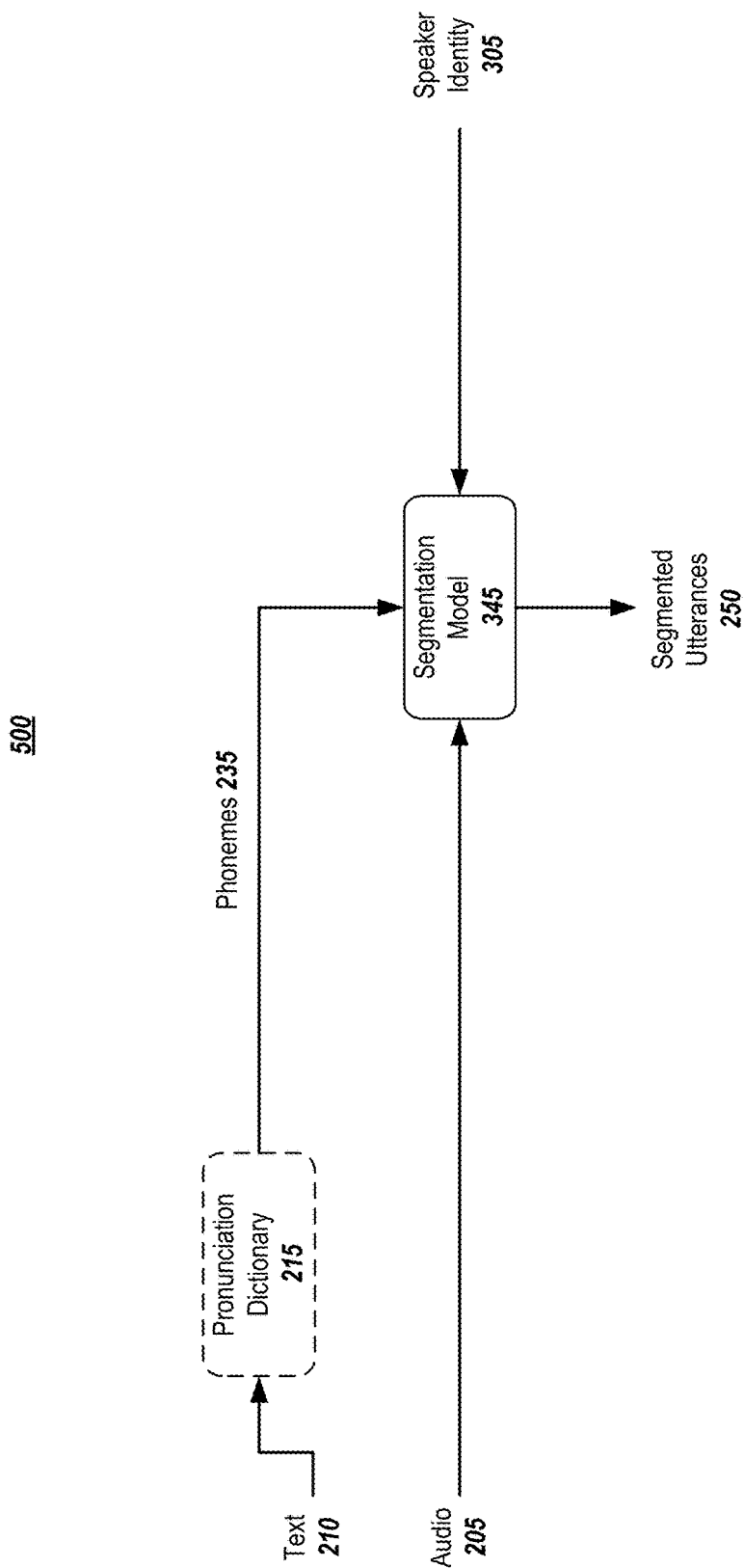
FIG. 5 depicts graphically depicts a simplified diagram for training of a multi-speaker segmentation model, according to embodiments of the present document.

FIG. 5 depicts graphically depicts a simplified diagram for training of a multi-speaker segmentation model 345, according to embodiments of the present document. It should be noted that, in one or more embodiments, the trained segmentation model 345 is used to produce segmented utterances 250, which are used to train other models, such as the duration model 340, the frequency model 325, and the vocal model 355. However, in embodiments, the trained segmentation model 345 is not used during deployment/inference, such as depicted in FIG. 3B.

Figure 6:
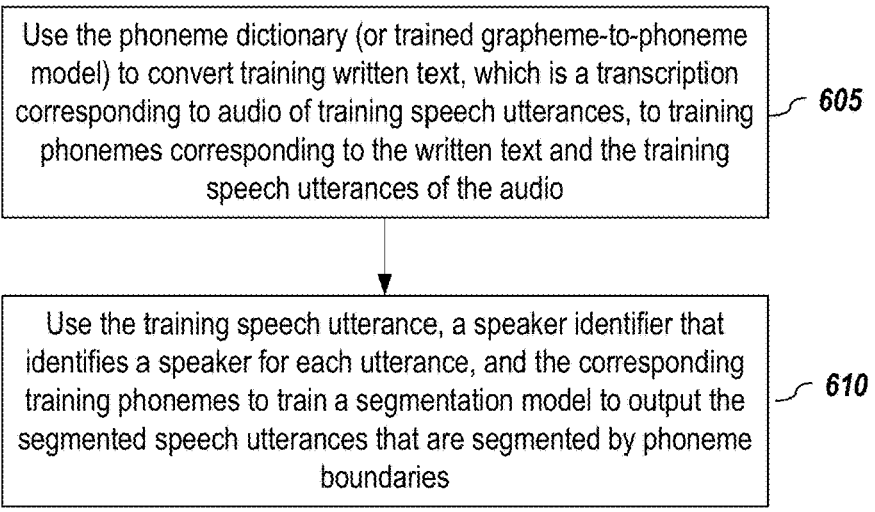
FIG. 6 depict a method for training a multi-speaker segmentation model, according to embodiments of the present document.

FIG. 6 depict a method for training a multi-speaker segmentation model, according to embodiments of the present document. In one or more embodiments, a phoneme dictionary (or trained grapheme-to-phoneme model) is used (605) to convert training written text 210, which is a transcription corresponding to audio of training speech utterances 205, to training phonemes 235 corresponding to the written text 210 and the training speech utterances audio 205. In one or more embodiments, the training speech utterance 205, a speaker identifier 305 that identifies a speaker for each utterance, and the corresponding training phonemes 235 are used (610) to train a segmentation model 345 to output the segmented speech utterances 250 that are segmented by phoneme boundaries. As previously noted, estimation of phoneme locations may be treated as an unsupervised learning problem. In one or more embodiments, phoneme pairs are classified using CTC loss, and CTC scores are used to determine boundaries imposing the overlap condition.

b) Duration Model Embodiments

Figure 7:
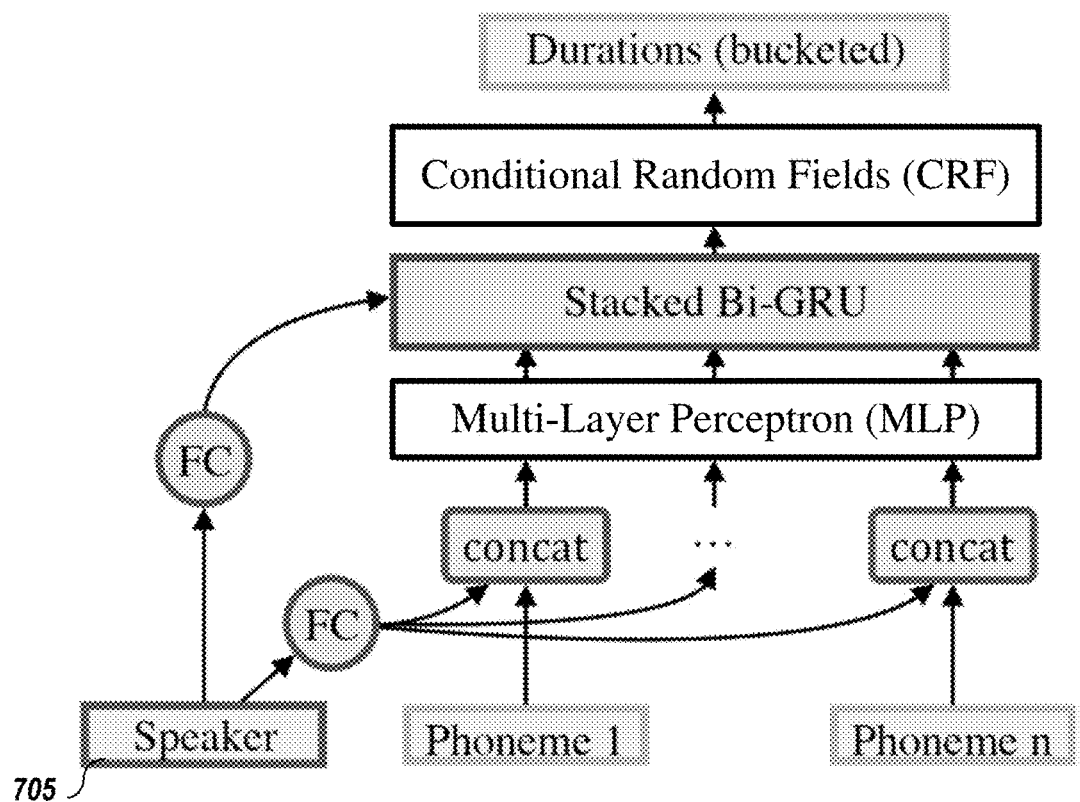
FIG. 7 graphically depict an architecture embodiment for a multi-speaker duration model, according to embodiments of the present document.

FIG. 7 graphically depict an architecture embodiment for a multi-speaker duration model, according to embodiments of the present document. Note that in the embodiment 700 depicted in FIG. 7, speaker embedding 705 is provided as an input to the duration model 700.

In one or more embodiments, the multi-speaker duration model may use speaker-dependent recurrent initialization and input augmentation. A site-specific embedding may be used to initialize RNN hidden states, and another site-specific embedding is provided as input to the first RNN layer by concatenating it to the feature vectors.

FIG. 8A depicts graphically depicts a simplified diagram for training of a multi-speaker duration model 340, according to embodiments of the present document. It should be noted that, in one or more embodiments, the trained duration model 340 is used to produce phoneme durations 260.

FIG. 9 depict a method for training a multi-speaker duration model, according to embodiments of the present document. In one or more embodiments, the training phonemes 235 corresponding to the input text 210, the speaker identifier 305 that identifies a speaker for each utterance, and the segmented speech utterances 250 from the trained segmentation model 345 are used (905) to train a multi-speaker duration model 340 to output phoneme durations 260.

FIG. 8B is a simplified graphical depiction of a trained multi-speaker duration model's 340 role during deployment/inference, according to embodiments of the present document. Note that during inference, the trained duration model 340 receives the phonemes 235 of the input text 210 and also receives as an input speaker embedding 305 identifying the speaker and outputs corresponding phoneme durations 260, which are used elsewhere in the deployed system (see, for example, FIG. 3B).

c) Frequency Model Embodiments

Figure 10:
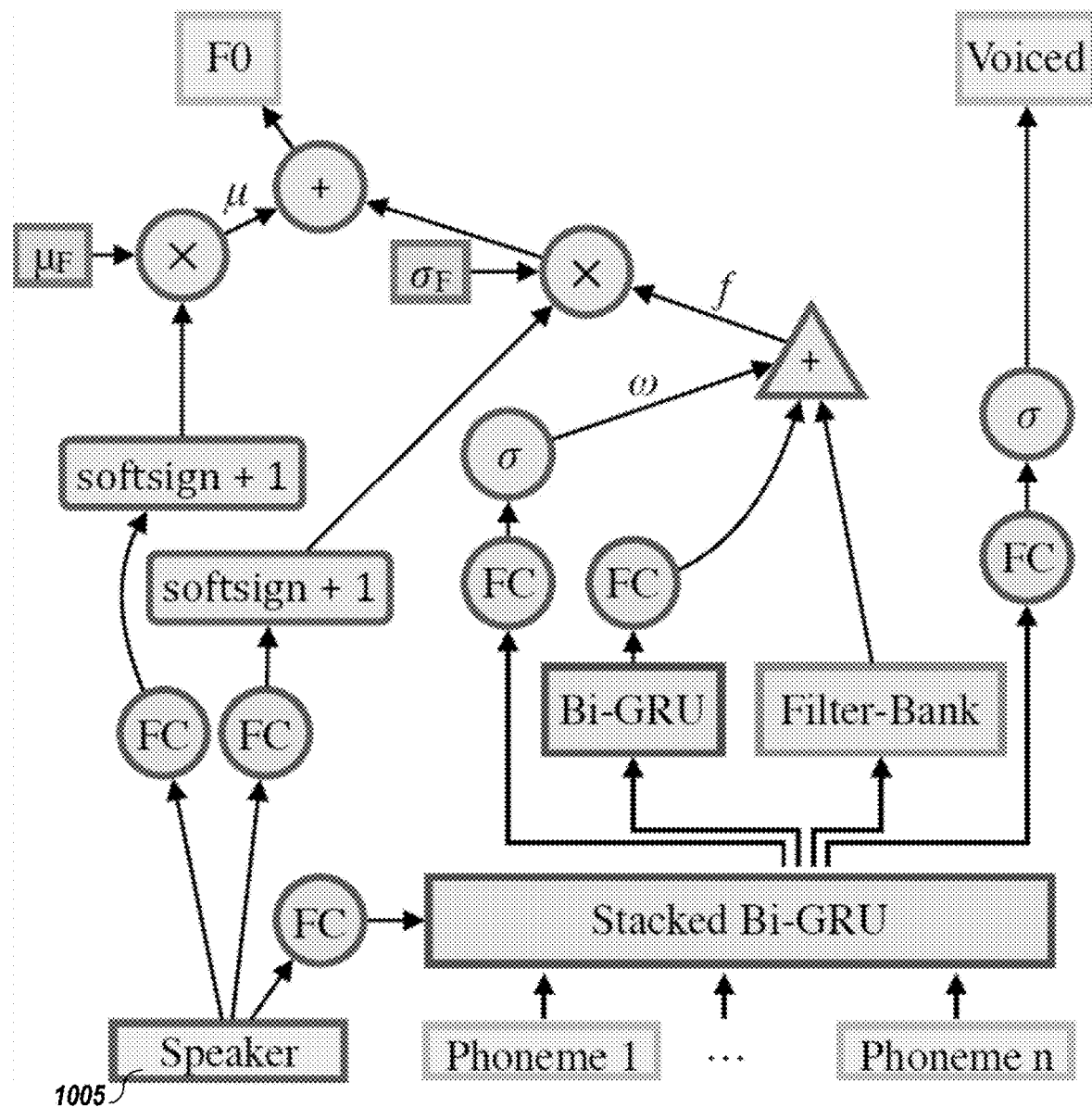
FIG. 10 graphically depict an architecture embodiment for a multi-speaker frequency model, according to embodiments of the present document.

FIG. 10 graphically depict an architecture embodiment for a multi-speaker frequency model, according to embodiments of the present document. Note that in the embodiment 1000 depicted in FIG. 10, speaker embedding 1005 is provided as an input to the frequency model 1000.

In one or more embodiments, the multi-speaker frequency model may use recurrent initialization, which initializes the recurrent layers (except for the recurrent output layer) with a single site-specific speaker-embedding.

As described in Section 3.C., the recurrent and convolutional output layers in the single-speaker frequency model predict a normalized frequency, which is then converted into the true fundamental frequency $F_0$ by a fixed linear transformation. In one or more embodiments, the linear transformation depends on the mean and standard deviation of observed fundamental frequency for the speaker. These values vary greatly between speakers: male speakers, for instance, tend to have a much lower mean fundamental frequency $F_0$. To better adapt to these variations, in one or more embodiments, the mean and standard deviation are made trainable model parameters and are multiplied by scaling terms which depend on the speaker embeddings. Specifically, instead of Eq. 4, the $F_0$ prediction may be computed as:

$$F_0 = \mu_{F_0} \cdot (1+\mathrm{softsign}(V_\mu^T g_f)) + \sigma_{F_0} \cdot (1+\mathrm{softsign}(V_\sigma^T g_f)) \cdot f \qquad (6)$$

where $g_f$ is a site-specific speaker embedding, $\mu_{F_0}$ and $\sigma_{F_0}$ are trainable scalar parameters initialized to the $F_0$ mean and standard deviation on the dataset, and $V_\mu$ and $V_\sigma$ are trainable parameter vectors.

FIG. 11A depicts graphically depicts a simplified diagram for training of a multi-speaker frequency model 325, according to embodiments of the present document. It should be noted that, in one or more embodiments, the trained frequency model 325 is used to produce frequency profiles 230 of the phonemes 235.

FIG. 12 depict a method for training a multi-speaker frequency model, according to embodiments of the present document. In one or more embodiments, frequency profiles for the training speech utterances audio 205 are extracted (1205), in which a frequency profile may comprise voicedness and time-dependent fundamental frequency, $F_0$. As discussed previously, a frequency extractor 220 may utilize a fundamental frequency and voicedness estimator, such as Praat software. The training phonemes 235, the audio of training speech utterances 205, the speaker identifier 305 that identifies the speaker for each utterance, and the extracted frequency profiles 230 for the training speech utterances 205 may then be used (1210) to train a frequency model 325 to output frequency profiles akin to the frequency profile 230 from the frequency extractor and with a capability to be adjusted based upon a speaker identifier 305.

FIG. 11B is a simplified graphical depiction of a trained multi-speaker frequency model's 325 role during deployment/inference, according to embodiments of the present document. Note that during inference, the trained frequency model 325 receives the phonemes 235 of the input text 210, the phoneme durations 260 from the trained duration model 340, and an input speaker embedding 305 identifying the speaker and outputs corresponding frequency profiles 230 for the phonemes durations, which are used by the vocal model in synthesizing the speech (see, for example, FIG. 3B).

d) Vocal Model Embodiments

Figure 13:
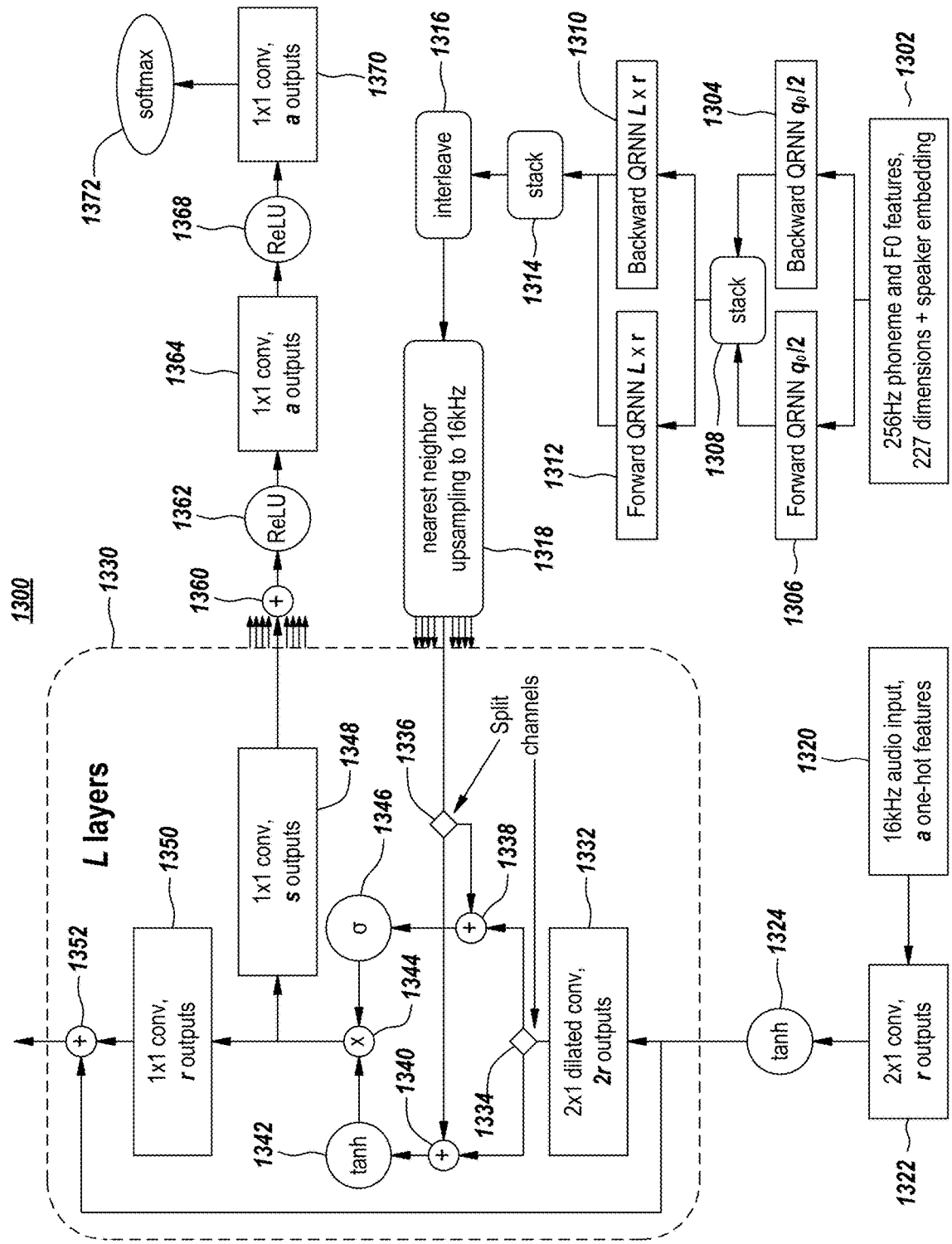
FIG. 13 depicts a vocal model architecture, according to embodiments of the present document.

FIG. 13 depicts a vocal model architecture, according to embodiments of the present document. In FIG. 13, components, by function, as follows: inputs are 1302 and 1320; convolutions and QRNNs are 1304, 1306, 1310, 1312, 1322, 1332, 1348, 1350, 1364, and 1370; unary operations are 1324, 1342, 1346, 1362, and 1368; softmax is 1372; binary operations are 1338, 1340, 1344, 1352, and 1360; and reshapes, transposes, and slices are 1308, 1314, 1316, and 1318; and split channels are 1334 and 1336. In one or more embodiments, the site-specific speaker embeddings are concatenated onto each input frame of the conditioner 1302, besides phoneme and frequency features. It shall be noted that the example values (e.g., 256 Hertz, 16 Hertz, etc. are provided by way of illustration and not limitation; one skilled in the art shall recognize that these specific values are not critical).

In one or more embodiments, the multi-speaker vocal model may use only input augmentation, with the site-specific speaker embedding concatenated onto each input frame of the conditioner. This differs from the global conditioning suggested in Oord et al. (2016) for the WaveNet architecture and allows the speaker embedding to influence the local conditioning network as well.

Without speaker embeddings, in one or more embodiments, the vocal model is still able to generate somewhat distinct-sounding voices because of the distinctive features provided by the frequency and duration models. However, having speaker embeddings in the vocal model increases the audio quality. It was observed in one or more embodiments that the embeddings converge to a meaningful latent space.

FIG. 14A depicts graphically depicts a simplified diagram for training of a multi-speaker vocal model 355, according to embodiments of the present document.

FIG. 15 depict a method for training a multi-speaker vocal model, according to embodiments of the present document. In one or more embodiments, the training phonemes 235, the audio of training speech utterances 205, the speaker identifier 305 that identifies the speaker for each utterance, one or more frequency profiles 230, and the segmented utterances 250 are used to train (1505) a vocal model 325 to output a signal representing synthesized human speech of the input text 210.

FIG. 14B is a simplified graphical depiction of a trained multi-speaker vocal model's 355 role during deployment/inference, according to embodiments of the present document. Note that during inference, the trained vocal model 355 receives the phonemes 235 of the input text 210, the phoneme durations 260 from the trained duration model 340, the frequency profiles 230 from the trained frequency model 325, and an input speaker embedding 305 identifying the speaker and outputs a signal representing synthesized human speech of the input text 210 that has audio characteristics corresponding to the speaker identity identified in the speaker identity indicator 305. Thus, a different speaker identity indicator 305 will cause the trained vocal model 355 to generate the same words but with different audio characteristics corresponding to the different speaker identity.

e) Deployed Embodiments

Figure 16:
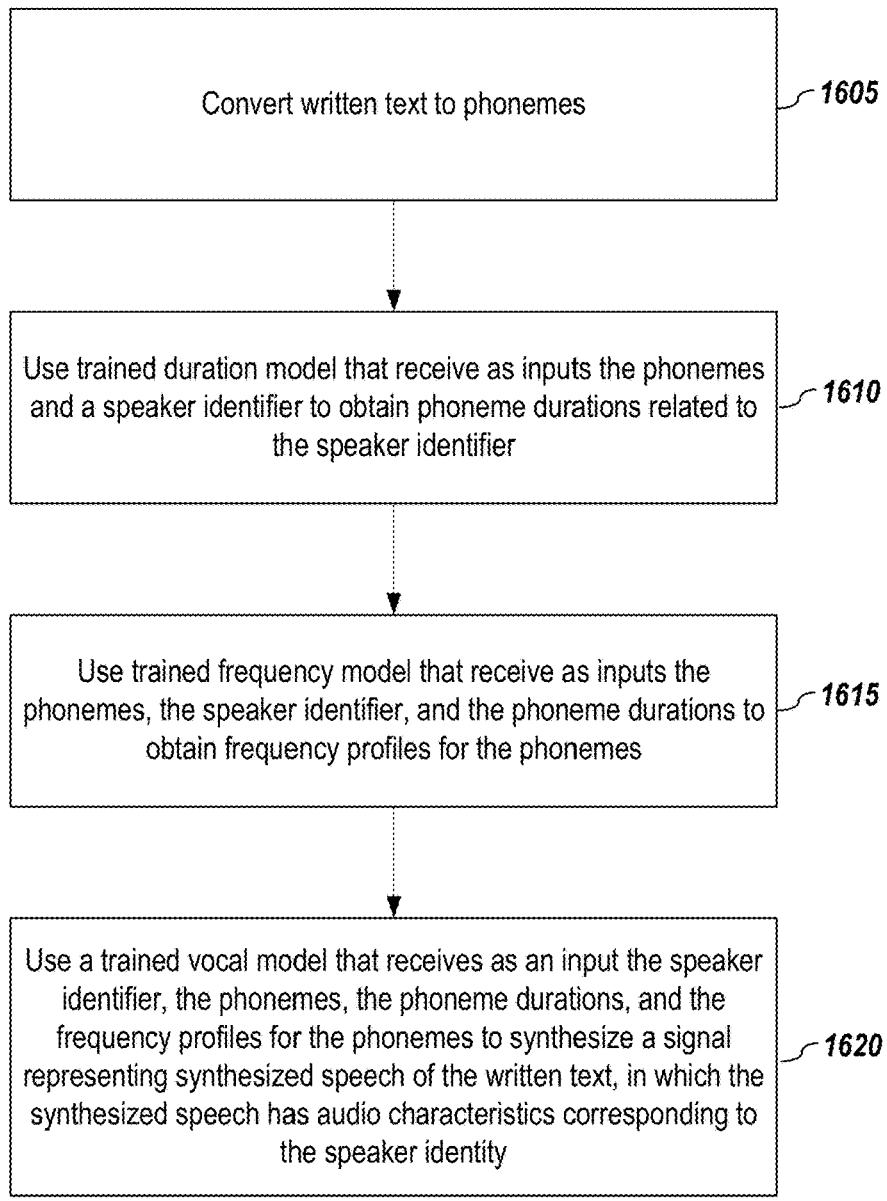
FIG. 16 depicts a method for using a multi-speaker text-to-speech system, according to embodiments of the present document.

FIG. 16 depicts a method for using a multi-speaker text-to-speech system, according to embodiments of the present document. In one or more embodiments, the input text (e.g., 210 in FIG. 3B) is converted (1605) to phonemes 235. A trained duration model (e.g., 340 in FIG. 3) receives as inputs the phonemes 235 and a speaker identifier 305 and outputs (1610) phoneme durations 260 for the phonemes 235 relative to the speaker identifier. A trained frequency model (e.g., 325 in FIG. 3) receive as inputs the phonemes, the speaker identifier, and the phoneme durations and outputs (1615) frequency profiles for the phonemes relative to the speaker identifier. Finally, in one or more embodiments, a trained vocal model (e.g., 355 in FIG. 3) receives as input the speaker identifier, the phonemes, the phoneme durations, the frequency profiles for the phonemes (e.g., a frequency profile for a phoneme is the fundamental frequency profile and a probability of whether it is voiced) to synthesize (1620) a signal representing synthesized speech of the written text 210, in which the synthesized audio has audio characteristics corresponding to the speaker identity. Thus, if the speaker identifier were changed, the audio characteristics would change to correspond to the identified speaker. For example, if the speaker identifier was a female with an English accent, the synthesized audio would sound like a woman with an English accent, but if the speaker identifier was changed to a male with a North American accent, the synthesized audio, while still saying the same words, would sound quite different.

B. Multi-Speaker Tacotron Embodiments

In addition to extending Deep Voice 2 embodiments with speaker embeddings, Tacotron (Wang et al., 2017), a sequence-to-sequence character-to-waveform model, was also modified as discussed herein to include speaker embeddings. When training multi-speaker Tacotron variants, it was found that model performance is highly dependent on model hyperparameters, and that some models often fail to learn attention mechanisms for a small subset of speakers. It was also found in one or more embodiments that if the speech in each audio clip does not start at the same timestep, the models are much less likely to converge to a meaningful attention curve and recognizable speech; thus, all initial and final silence in each audio clip may be trimmed. Due to the sensitivity of the model to hyperparameters and data pre-processing, additional tuning may be necessary to obtain maximal quality. Thus, one of the focuses herein is on demonstrating that Tacotron, like Deep Voice 2 embodiments, is capable of handling multiple speakers through speaker embeddings, rather than comparing the quality of the two architectures.

a) Character-to-Spectrogram Model Embodiments

In one or more embodiments, the Tacotron character-to-spectrogram architecture comprises a convolution-bank-highway-GRU (CBHG) encoder, an attentional decoder, and a CBHG post-processing network. Modifications to the architecture are discussed below.

It was found that incorporating speaker embeddings into the CBHG post-processing network degrades output quality, whereas incorporating speaker embeddings into the character encoder is beneficial. Without a speaker-dependent CBHG encoder, such a model embodiment is incapable of learning its attention mechanism and cannot generate meaningful output (see Appendix C.2 for speaker-dependent attention visualizations). To condition the encoder on the speaker, one site-specific embedding may be used as an extra input to each highway layer at each timestep and initialize the CBHG RNN state with a second site-specific embedding.

In one or more embodiments, it is beneficial to augment the decoder with speaker embeddings. One site-specific embedding may be used as an extra input to the decoder pre-net, one extra site-specific embedding as the initial attention context vector for the attentional RNN, one site-specific embedding as the initial decoder GRU hidden state, and one site-specific embedding as a bias to the tanh in the content-based attention mechanism.

b) Spectrogram-to-Waveform Model Embodiments

Figure 17:
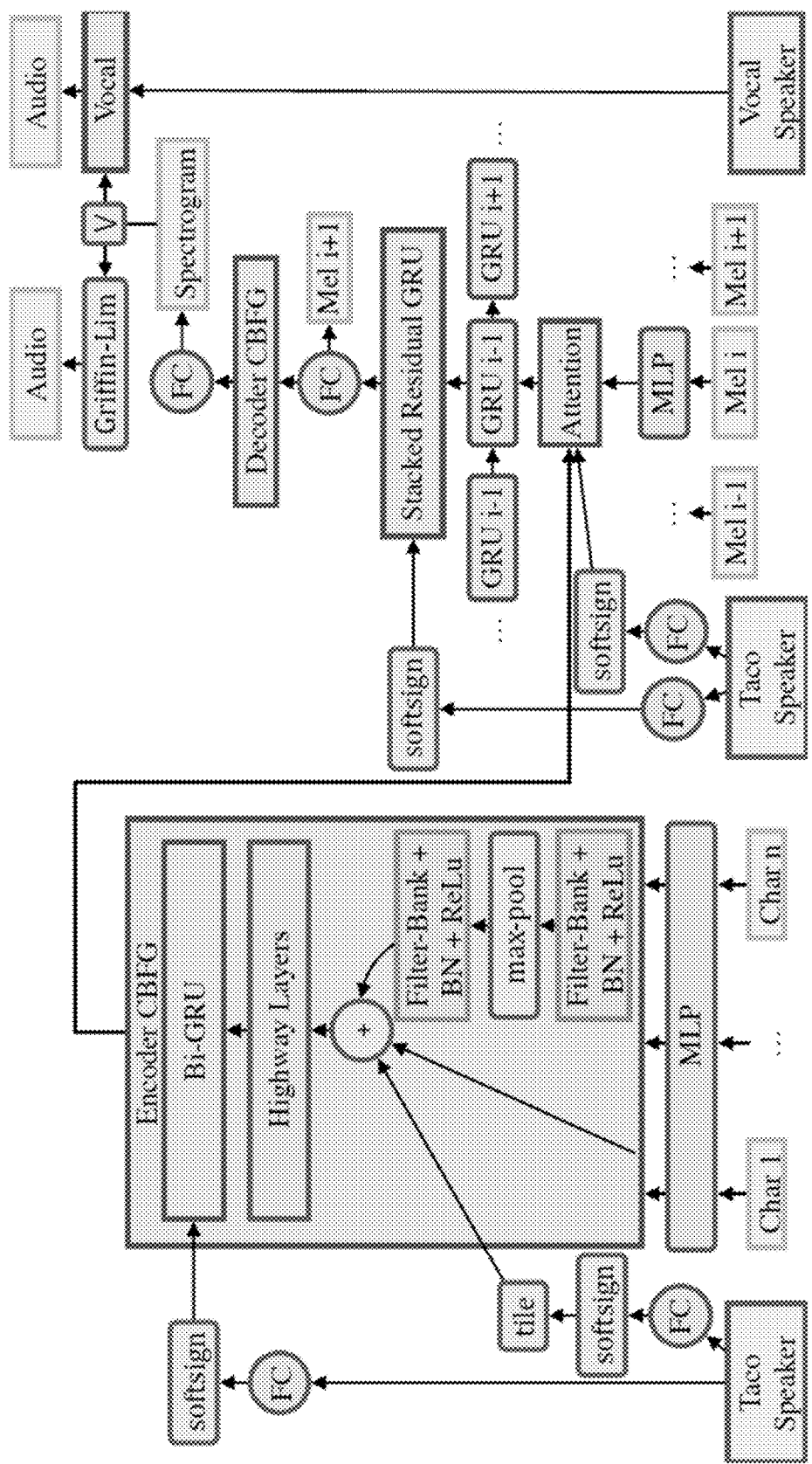
FIG. 17 depicts a Tacotron-WaveNet model with speaker conditioning in the Encoder CBHG module and decoder with two ways to convert spectrogram to audio: Griffin-Lim or a speaker-conditioned Vocal model, according to embodiments of the present document.

The original Tacotron implementation in Wang et al. uses the Griffin-Lim algorithm to convert spectrograms to time-domain audio waveform by iteratively estimating the unknown phases. Estimation of the unknown phases may be done by repeatedly converting between frequency and time domain representations of the signal using the short-time Fourier transform and its inverse, substituting the magnitude of each frequency component to the predicted magnitude at each step. Minor noise in the input spectrogram can cause noticeable estimation errors in the Griffin-Lim algorithm and the generated audio quality is degraded. To produce higher quality audio from Tacotron, instead of using Griffin-Lim, in one or more embodiments, a WaveNet-based neural vocoder may be trained to convert from linear spectrograms to audio waveforms. In one or more embodiments, a model similar to a Deep Voice 2 vocal model embodiment may be used, but takes linear-scaled log-magnitude spectrograms instead of phoneme identity and $F_0$ as input. A combined Tacotron-WaveNet model embodiment is shown in FIG. 17. FIG. 17 depicts a Tacotron-WaveNet model with speaker conditioning in the Encoder CBHG module and decoder with two ways to convert spectrogram to audio: Griffin-Lim or a speaker-conditioned Vocal model, according to embodiments of the present document. As will be shown in Section 5.A. (below), WaveNet-based neural vocoder indeed significantly improves single-speaker Tacotron as well.

5. Results

In this section, the results on both single-speaker and multi-speaker speech synthesis using the described architectures are presented. All model hyperparameters are presented in Appendix A. It shall be noted that these experiments and results are provided by way of illustration and were performed under specific conditions using a specific embodiment or embodiments; accordingly, neither these experiments nor their results shall be used to limit the scope of the disclosure of the current patent document.

A. Single-Speaker Speech Synthesis Results

Embodiments of Deep Voice 1, Deep Voice 2, and Tacotron were trained on an internal English speech database containing approximately 20 hours of single-speaker data. The intermediate evaluations of models in Deep Voice 1 and Deep Voice 2 can be found in Table 1 (above). A Mean Opinion Score (MOS) evaluation using a crowdMOS framework was run to compare the quality of samples and the results are shown in Table 2. The results show conclusively that the architecture improvements in Deep Voice 2 yield significant gains in quality over the Deep Voice 1 embodiment. They also demonstrate that converting Tacotron-generated spectrograms to audio using WaveNet is preferable to using the iterative Griffin-Lim algorithm.

TABLE 2

Mean Opinion Score (MOS) evaluations with 95% confidence intervals of Deep Voice 1, Deep Voice 2, and Tacotron embodiments. Using the crowdMOS toolkit, batches of samples from these models were presented to raters on Mechanical Turk. Since batches contained samples from all models, the experiment naturally induces a comparison between the models.

| Model | Sample Freq. | MOS |
|---|---|---|
| Deep Voice 1 | 16 KHz | 2.05 ± 0.24 |
| Deep Voice 2 | 16 KHz | 2.96 ± 0.38 |
| Tacotron (Griffin-Lim) | 24 KHz | 2.57 ± 0.28 |
| Tacotron (WaveNet) | 24 KHz | 4.17 ± 0.18 |

B. Multi-Speaker Speech Synthesis Results

In one or more embodiments, the aforementioned models were trained on the VCTK dataset with 44 hours of speech, which contains 108 speakers with 400 utterances each. The model embodiments were also trained on an internal dataset of audiobooks, which contains 477 speakers with 30 minutes of audio each (for a total of ~238 hours of audio). The consistent sample quality observed from the inventive models disclosed herein indicates that these inventive architecture embodiments can easily learn hundreds of distinct voices with a variety of different accents and cadences. It was also observed that the learned embeddings lie in a meaningful latent space (see FIG. 18 as an example and Appendix C for more details). FIG. 18 depicts principal components of the learned speaker embeddings for an 80-layer vocal model (1805) and for a character-to-spectrogram model for VCTK dataset (1810), according to embodiments of the present document.

In order to evaluate the quality of the synthesized audio, MOS evaluations were performed using the crowdMOS framework; the results are presented in Table 3 (below). Ground truth samples were purposely included in the set being evaluated, because the accents in the VCTK dataset are likely to be unfamiliar to North American crowdsourced raters and will thus be rated poorly due to the accent rather than due to the model quality. By including ground truth samples, the MOS of the models can be compared with the ground truth MOS and thus the model quality can be evaluated rather than the data quality; however, the resulting MOS may be lower, due to the implicit comparison with the ground truth samples. Overall, it was observed that the Deep Voice 2 model can approach an MOS value that is close to the ground truth, when low sampling rate and companding/expanding taken into account.

A multi-speaker TTS system with high sample quality but indistinguishable voices would result in high MOS but fail to meet the desired objective of reproducing the input voices accurately. To demonstrate that the model embodiments of the present document not only generate high quality samples, but also generate easily distinguishable voices, the classification accuracy of a speaker discriminative model embodiment was also measured on the generated samples. The speaker discriminative was a convolutional neural architecture trained to classify utterances based on their speaker, trained on the same dataset as the TTS systems themselves. If the voices were indistinguishable (or the audio quality was low), the classification accuracy would be much lower for synthesized samples than it is for the ground truth samples. As shown in Table 3, classification accuracy demonstrates that samples generated from model embodiments of the present document are as distinguishable as the ground truth samples (see Appendix D). The classification accuracy is significantly lower for Tacotron with WaveNet, and the generation errors in the spectrogram are likely exacerbated by the WaveNet, as it is trained with ground truth spectrograms.

TABLE 3

MOS and classification accuracy for multi-speaker model embodiments. To obtain MOS, the crowdMOS toolkit was used as detailed in Table 2 (above). Batches of synthesized samples from model embodiments as well as ground truth samples were presented to raters on Mechanical Turk. Since, in embodiments, batches contained samples from all sources, the experiment naturally induces a comparison between the models and ground truth samples. The classification accuracies of the speaker discriminative models (see Appendix D for details) on the samples, showing that the synthesized voices are as distinguishable as ground truth audio.

| Dataset | Multi-Speaker Model | Sample Freq. | MOS | Classification Accuracy |
| --- | --- | --- | --- | --- |
| VCTK | Deep Voice 2 (20-layer WaveNet) | 16 KHz | 2.87 ± 0.13 | 99.9% |
| VCTK | Deep Voice 2 (40-layer WaveNet) | 16 KHz | 3.21 ± 0.13 | 100% |
| VCTK | Deep Voice 2 (60-layer WaveNet) | 16 KHz | 3.42 ± 0.12 | 99.7% |
| VCTK | Deep Voice 2 (80-layer WaveNet) | 16 KHz | 3.53 ± 0.12 | 99.9% |
| VCTK | Tacotron (Griffin-Lim) | 24 KHz | 1.68 ± 0.12 | 99.4% |
| VCTK | Tacotron (20-layer WaveNet) | 24 KHz | 2.51 ± 0.12 | 60.9% |
| VCTK | Ground Truth Data | 48 KHz | 4.65 ± 0.06 | 99.7% |
| Audiobooks | Deep Voice 2 (80-layer WaveNet) | 16 KHz | 2.97 ± 0.17 | 97.4% |
| Audiobooks | Tacotron (Griffin-Lim) | 24 KHz | 1.73 ± 0.22 | 93.9% |
| Audiobooks | Tacotron (20-layer WaveNet) | 24 KHz | 2.11 ± 0.20 | 66.5% |
| Audiobooks | Ground Truth Data | 44.1 KHz | 4.63 ± 0.04 | 98.8% |

6. Some Conclusions

It was shown herein how entirely-neural speech synthesis pipelines may be extended to multi-speaker text-to-speech via low-dimensional trainable speaker embeddings. Improved single-speaker model embodiments were developed to use as a starting point for multi-speaker embodiments. Next, the applicability of technique embodiments discussed herein were demonstrated by training both multi-speaker Deep Voice 2 models and multi-speaker Tacotron models, and their quality were evaluated through MOS. Speaker embedding technique embodiments were used to create high quality text-to-speech systems and conclusively show that neural speech synthesis models can learn effectively from small amounts of data spread among hundreds of different speakers.

One skilled in the art shall recognize that alternative systems and/or methods may be generated, such as adding new speakers to a system by fixing model parameters and solely training new speaker embeddings, and using the speaker embeddings as a meaningful vector space, as is possible with word embeddings.

7. Computing System Embodiments

In one or more embodiments, aspects of the present patent document may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 19:
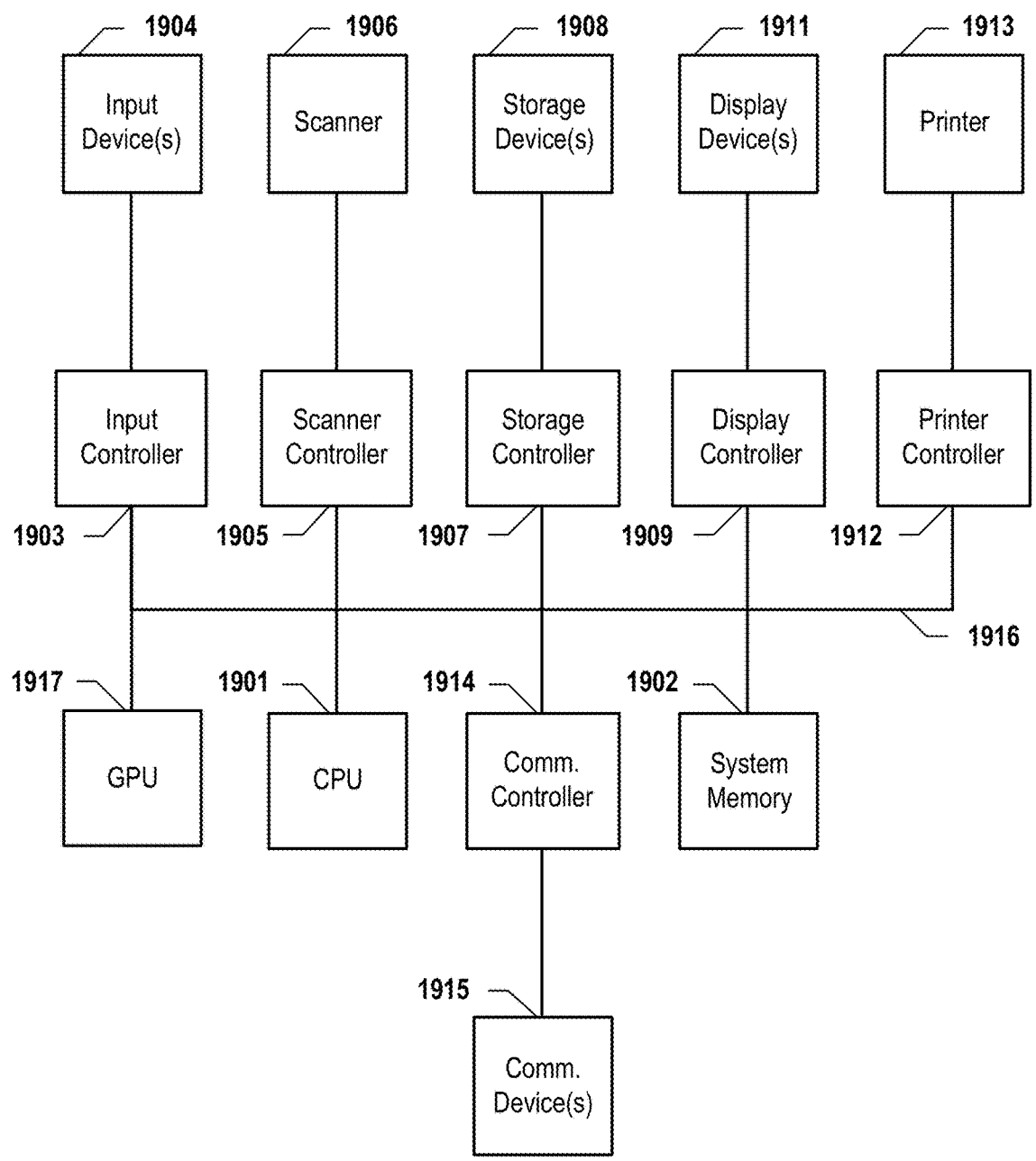
FIG. 19 depicts a simplified block diagram of a computing device/information handling system, in accordance with embodiments of the present document.

FIG. 19 depicts a simplified block diagram of a computing device/information handling system (or computing system) according to embodiments of the present disclosure. It will be understood that the functionalities shown for system 1900 may operate to support various embodiments of an information handling system—although it shall be understood that an information handling system may be differently configured and include different components.

As illustrated in FIG. 19, system 1900 includes one or more central processing units (CPU) 1901 that provides computing resources and controls the computer. CPU 1901 may be implemented with a microprocessor or the like, and may also include one or more graphics processing units (GPU) 1917 and/or a floating point coprocessor for mathematical computations. System 1900 may also include a system memory 1902, which may be in the form of random-access memory (RAM), read-only memory (ROM), or both.

A number of controllers and peripheral devices may also be provided, as shown in FIG. 19. An input controller 1903 represents an interface to various input device(s) 1904, such as a keyboard, mouse, or stylus. There may also be a scanner controller 1905, which communicates with a scanner 1906. System 1900 may also include a storage controller 1907 for interfacing with one or more storage devices 1908 each of which includes a storage medium such as magnetic tape or disk, or an optical medium that might be used to record programs of instructions for operating systems, utilities, and applications, which may include embodiments of programs that implement various aspects of the present invention. Storage device(s) 1908 may also be used to store processed data or data to be processed in accordance with the invention. System 1900 may also include a display controller 1909 for providing an interface to a display device 1911, which may be a cathode ray tube (CRT), a thin film transistor (TFT) display, or other type of display. The computing system 1900 may also include a printer controller 1912 for communicating with a printer 1913. A communications controller 1914 may interface with one or more communication devices 1915, which enables system 1900 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1916, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

8. Appendix A—Model Hyperparameters

The hyperparameters of the model embodiments used herein are provided in Table 4 (below).

In one or more embodiments, to speed up the training of character-to-spectrogram model in Tacotron in the experiments, a penalty term in the form CTC loss (obtained from the attention hidden states) was added to the overall loss function. Faster convergence was observed in some cases.

Learning rate is presented as a triple $\ell$-r-s, which means that the initial learning rate of $\ell$ was decayed by a factor of r every s iterations. All experiment model embodiments used the Adam optimization technique with $\beta_1=0.9$, $\beta_2=0.99$, and $\varepsilon=10^{-8}$.

In embodiments, convolutional layers are presented as l×, o, h×w filters, which means that there are l convolutional layers, and o (output channels) filters in each layer. The filter size is h×w, where height h is in frequency bins and width w is in time frames. Any unspecified details or hyperparameters for Deep Voice 2 are identical to those from the best models used in the original implementation of Deep Voice 1, which is also discussed in S. O. Arik, M. Chrzanowski, A. Coates, G. Diamos, A. Gibiansky, Y. Kang, X. Li, J. Miller, J. Raiman, S. Sengupta, and M. Shoeybi. Deep voice: Real-time neural text-to-speech. In ICML, 2017, which is also available at arxiv.org/pdf/1702.07825.pdf, each document is incorporated in its entirety herein by reference. Similarly, any unspecified details or hyperparameters for our Tacotron implementation are identical to those from the best models used in the original implementation of Tacotron (Wang et al., 2017).

TABLE 4

| | Model hyperparameters for speech synthesis models | | | |
|---|---|---|---|---|
| | | Single-Speaker | VCTK | Audiobooks |
| Segmentation | Number of MFCCs | 40 | 40 | 40 |
| | Convolutional layers | 4×, 1289 × 5 filters | 4×, 64 9 × 5 filters | 5×, 128 9 × 5 filters |
| | Recurrent layers (Bi-GRU) | 4×, 512-wide | 4×, 1024-wide | 4×, 1024-wide |
| | Dropout keep probability | 0.95 | 0.85 | 0.85 |
| | Learning rate | $10^{-3} - 0.95 - 400$ | $2 \cdot 10^{-4} - 0.95 - 1000$ | $2 \cdot 10^{-4} - 0.95 - 2000$ |
| | Silence threshold | 0.1 | 0.1 | 0.1 |
| | Gaussian width | 0.25 ms | 0.25 ms | 0.25 ms |
| | Batch size | 8 | 8 | 8 |
| | Speaker embedding size | N/A | 16 | 32 |
| Duration | Fully-connected | 2×, 256 units | 4×, 256 units | 4×, 256 units |
| | Recurrent layers (Bi-GRU) | 4×, 256-wide | 4×, 512-wide | 4×, 512-wide |
| | Dropout keep probability | 0.8 | 0.85 | 0.85 |
| | Output buckets | 100 | 250 | 300 |
| | Learning rate | $3 \cdot 10^{-4} - 0.9 - 300$ | $6 \cdot 10^{-4} - 0.9 - 400$ | $3 \cdot 10^{-4} - 0.9 - 800$ |
| | Batch size | 128 | 32 | 32 |
| | Speaker embedding size | N/A | 16 | 32 |
| Frequency | Hidden layers (Bi-GRU) | 3×, 256-wide | 3×, 512-wide | 3×, 512-wide |
| | Output dimension | 32 | 32 | 64 |
| | Convolution widths | 5, 10, 20 | 3, 6, 15, 30 | 6, 9, 18, 35 |
| | Learning rate | $10^{-3} - 0.9 - 300$ | $4 \cdot 10^{-4} - 0.9 - 300$ | $4 \cdot 10^{-4} - 0.9 - 300$ |
| | Batch size | 32 | 32 | 32 |
| | Speaker embedding size | N/A | 16 | 16 |
| Vocal | Layers | 60 | 20/40/60/80 | 80 |
| | Learning rate | $10^{-3} - 0.9886 - 1000$ | $10^{-3} - 0.9886 - 1000$ | $10^{-3} - 0.9886 - 1000$ |
| | Batch size | 8 | 8 | 8 |
| | Speaker embedding size | N/A | 16 | 16 |
| Character-to-Spectrogram | Enc.-CBHG bank size | 16 | 16 | 16 |
| | Enc.-CBHG channels | 128 | 128 | 128 |
| | Enc.-CBHG recurrent size | 128 | 128 | 128 |
| | Enc.-CBHG highway layers | 4 | 4 | 4 |
| | Enc.-CBHG maxpool width | 2 | 2 | 2 |
| | Enc.-CBHG proj. sizes | 128, 128 | 128, 128 | 128, 128 |
| | Enc.-CBHG proj. width | 3 | 3 | 3 |
| | Decoder layers | 3 | 3 | 3 |
| | Dropout keep probability | 0.5 | 0.8 | 0.8 |
| | Attention size | 128 | 256 | 512 |
| | Attention state size | 256 | 256 | 256 |
| | Decoder prenet sizes | 256, 128 | 256, 128 | 256, 128, 64 |
| | Post-CBHG bank size | 8 | 8 | 8 |
| | Post-CBHG channels | 128 | 512 | 512 |
| | Post-CBHG conv. widths | 3 | 3 | 3 |
| | Post-CBHG recurrent size | 128 | 256 | 256 |
| | Post-CBHG highway layers | 4 | 4 | 4 |
| | Post-CBHG maxpool width | 2 | 2 | 2 |
| | Reduction factor | 4 | 4 | 4 |
| | CTC loss coefficient | 0.01 | 0.01 | 0.01 |
| | Learning rate | $10^{-3} - 1 - $ N/A | $10^{-3} - 0.95 - 3000$ | $10^{-3} - 0.95 - 3000$ |
| | Batch size | 16 | 16 | 16 |
| | Speaker embedding size | N/A | 32 | 32 |

9. Appendix B—Training Time for Multi-Speaker Model Embodiments

The details of training time for multi-speaker model embodiments are presented in Table 5. In one or more embodiments, the same optimized WaveNet inference kernels described in Deep Voice 1 were used.

TABLE 5

Training time details of multi-speaker Deep Voice 2 and Tacotron models on VCTK dataset.

| Model | Hardware | Time per iteration | Number of iterations | Total time |
|---|---|---|---|---|
| Segmentation | 1 Titan X GPU | 1200 ms | 90k | 30 hours |
| Duration | 1 Tesla K40 GPU | 320 ms | 60k | 4.5 hours |
| Frequency | 1 Tesla K40 GPU | 1100 ms | 25k | 7.5 hours |
| Vocal (20 layer) | 8 Titan X GPUs | 280 ms | 350k | 27 hours |
| Vocal (40 layer) | 8 Titan X GPUs | 450 ms | 350k | 44 hours |
| Vocal (60 layer) | 8 Titan X GPUs | 500 ms | 500k | 83 hours |
| Vocal (80 layer) | 8 Titan X GPUs | 780 ms | 500k | 108 hours |
| Character-to-spectrogram | 1 TitanX GPU | 450 ms | 200k | 25 hours |

10. Appendix C—Interpretation of Learned Embeddings

In this section, the consequences of speaker-dependent models on intermediate model outputs, model activations, and the distributions of the learned embeddings are discussed.

A. Appendix C.1—Speaker-Dependent Fundamental Frequency Profiles

Figure 20:
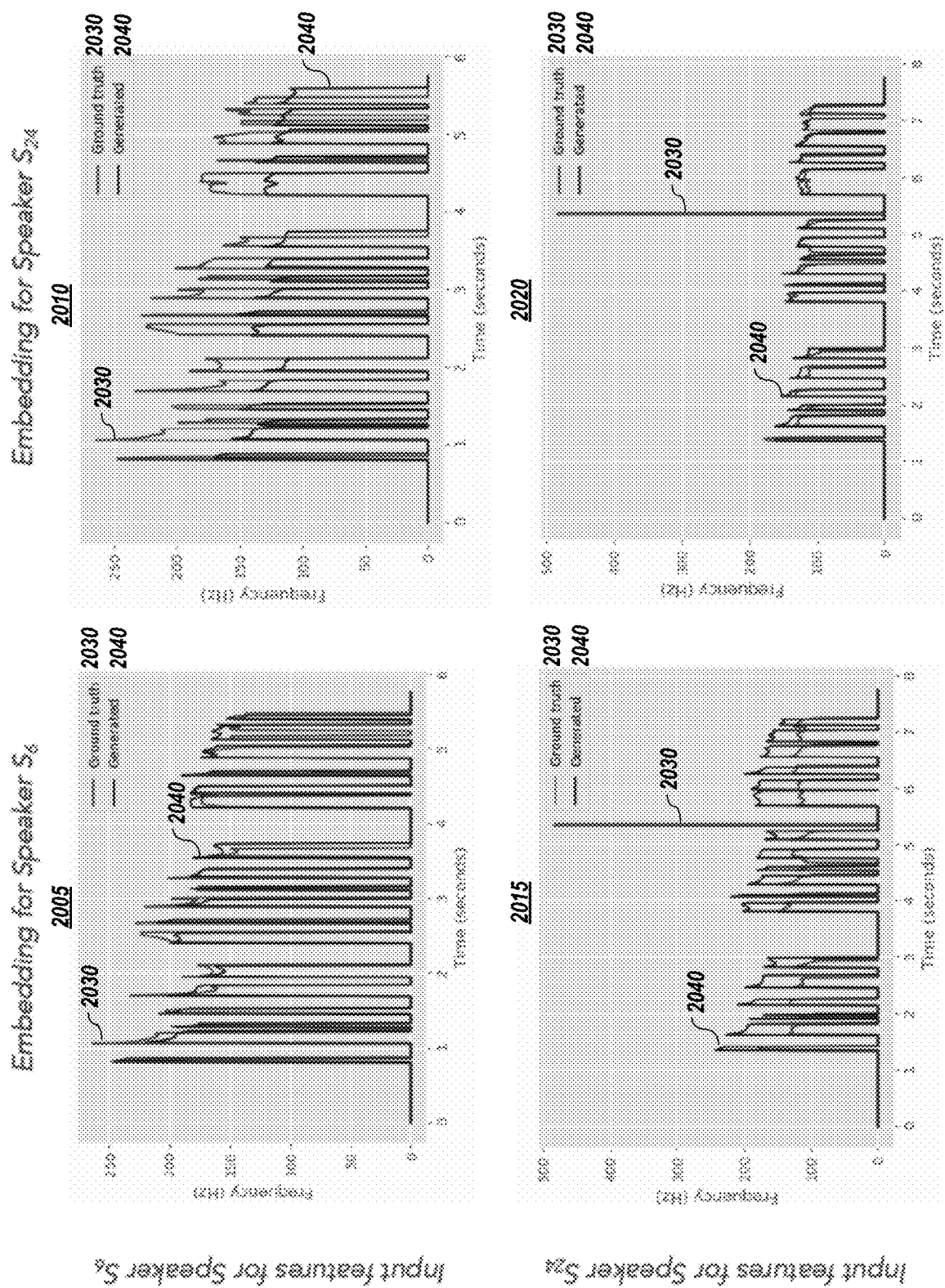
FIG. 20 depicts time-dependent fundamental frequency profiles (collectively the $F_0$ and voicedness) generated by a model embodiment when the inputs and embeddings correspond to two speakers (Speaker $S_6$ and $S_{24}$), according to embodiments of the present document.

To demonstrate the significance of the speaker embeddings, inference was performed for a frequency model embodiment with the speaker embedding vectors corresponding to the actual speaker and a different speaker. As shown in FIG. 20, while the input phoneme features are dominant in determining the overall shape of the fundamental frequency profiles, the actual values are highly speaker dependent. For example, when the speaker embedding vector of a male is substituted with the speaker embedding vector of a female, the output frequency profile would cause generation of a female voice despite all the other input features correspond to the correct male speaker.

FIG. 20 depicts time-dependent fundamental frequency profiles 2040 in graphs 2005, 2010, 2015, and 2020 (collectively the $F_0$ and voicedness) generated by a model embodiment when the inputs and embeddings correspond to two speakers (Speaker $S_6$ and $S_{24}$), according to embodiments of the present document. Speaker $S_6$ is a 23-year-old female with a Southern England accent, and Speaker $S_{24}$ is a 24-year-old male with an Indian accent. The pronounced sentence was "Six spoons of fresh snow peas five thick slabs of blue cheese and maybe a snack for her brother Bob." Spikes in the ground truth 2030 are caused by the estimation errors using the Praat software, and it was observed that the frequency model embodiment can compensate them in some cases, learning from the other correct ground truth samples.

B. Appendix C.2—Speaker-Dependent Attention Plots

Figure 21:
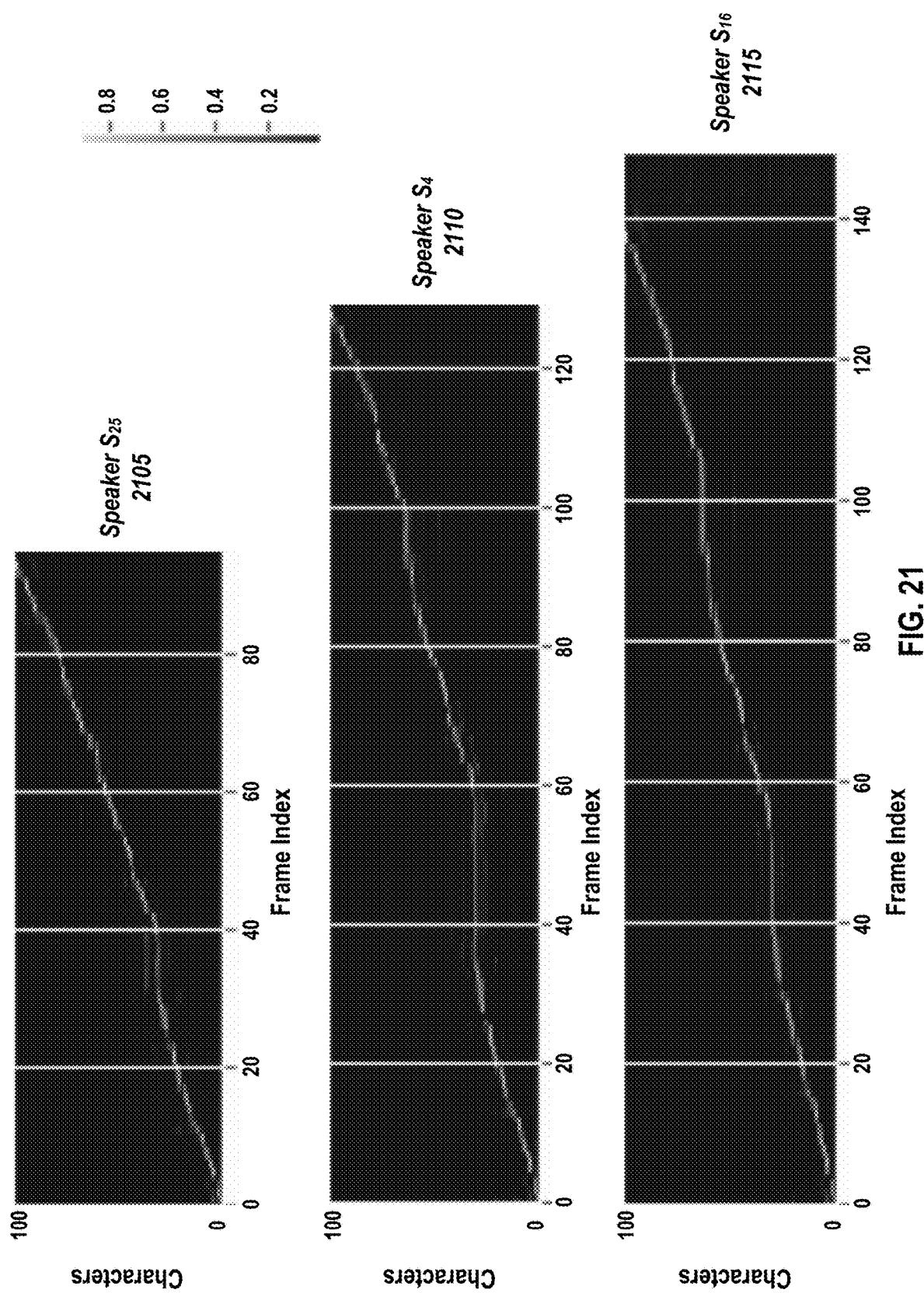
FIG. 21 presents attention plots for three speakers who speak at different speeds, according to embodiments of the present document.

FIG. 21 presents attention plots for three speakers who speak at different speeds, according to embodiments of the present document. Speaker $S_{25}$ is a 22-year-old male with a Scottish accent (graph 2105); Speaker $S_4$ is a 23-year-old female with a Southern England accent (graph 2110); and Speaker $S_{16}$ is a 22-year-old male with a London English accent (graph 2115). The pronounced sentence is "Six spoons of fresh snow peas five thick slabs of blue cheese and maybe a snack for her brother Bob." FIG. 21 demonstrates that the modifications in an embodiment of the encoder architecture are highly effective in making the attention model speaker dependent such that different portions of the input text can be focused depending on the speaking features of the speaker.

C. Appendix C.3—Principal Components of the Embeddings

The latent space of learned speaker embeddings was explored by visualizing them in a lower dimensional space. FIG. 18 shows the first two principal components of the learned embeddings of a vocal model embodiment (1805) and a character-to-spectrogram model embodiment (1810), according to embodiments of the present document. Plots 1805 and 1810 depict the principal components of learned embeddings for the model embodiments, shown with the genders of the speakers. Also explored were the principal components of English language accents. The regions were determined according to https://en.wikipedia.org/wiki/Regional_accents_of_English. Although they were initialized randomly and completely trained based on a loss function related to the generative quality, discriminative patterns in the learned embeddings can be observed. Gender of the speaker was the most apparent discriminative pattern in the learned embeddings that even a linear classifier fit on the shown two-dimensional space can classify the gender with a very high accuracy. There are also apparent discriminative patterns for the region of the speaker. In a two-dimensional space, Great Britain and North American accent regions especially seem highly separable.

11. Appendix D—Speaker Discriminative Model Embodiments

Figure 22:
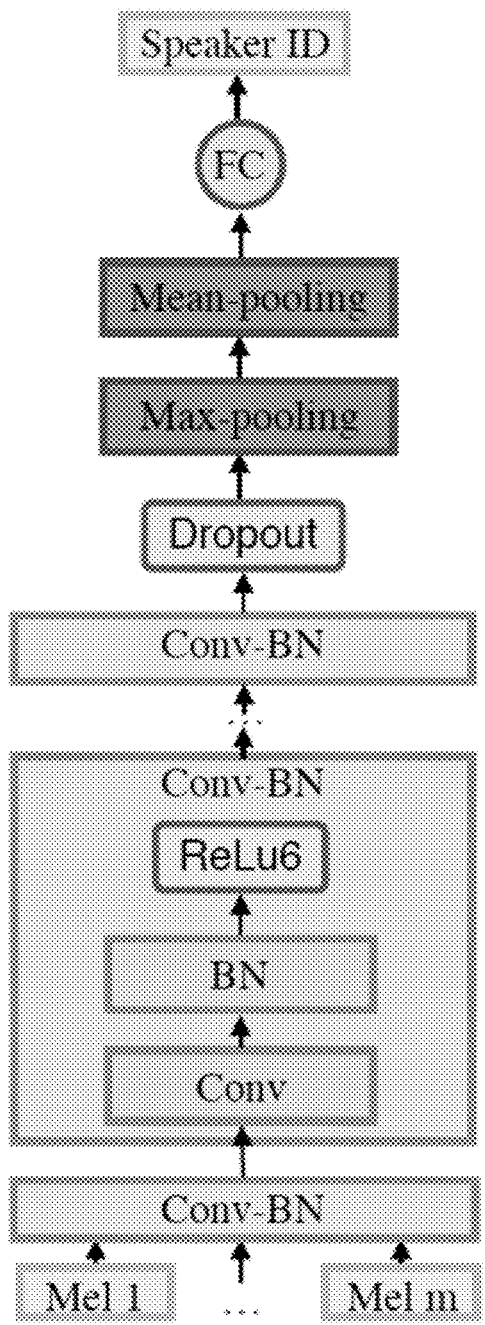
FIG. 22 graphically depicts an architecture for speaker discrimination, according to embodiments of the present document.

To compute multi-speaker discriminator accuracy, a speaker discriminator model trained on the ground truth data set of multiple speakers was used. Although using another discriminator model, such as Deep Speaker or other methods, would also suffice, a new deep-learning-based discriminative model was created. It is noted that the accuracy results on the test set are on par with the state-of-the-art speaker classification methods in the literature. FIG. 22 graphically depicts an architecture for speaker discrimination, according to embodiments of the present document. In one or more embodiments, a mel-frequency cepstral coefficients (MFCCs) computed after resampling the input to a constant sampling frequency was used. Then, in one or more embodiments, two-dimensional convolutional layers convolving over both time and cepstral frequency bands, with a rectified linear unit (relu) nonlinearity clipped to a maximum of six after each convolutional layer were used. In one or more embodiments, the last convolutional layer is followed by max-pooling layer. The model 2400 then mean-pools over time for all utterance timesteps and applies a fully connected layer with a relu nonlinearity followed by a fully connected output layer with a softmax nonlinearity and cross-entropy classification loss. In one or more embodiments, to avoid overfitting to the dataset, a dropout is applied after every relu nonlinearity.

To demonstrate that the classification results are not sensitive to the choice of the hyperparameters of the discriminative model, the classification accuracy for other choices are demonstrated in this section. Hyperparameters for all the discriminator models are available in Table 7. Only the results for the models, D3 and D8, are presented in Table 3, as they yielded the highest validation set accuracy.

TABLE 6

Hyperparameters for speaker discriminative models for VCTK dataset.

| Parameter | D1 | D2 | D3 (in Table 3) | D4 |
|---|---|---|---|---|
| Audio resampling freq. | 16 KHz | 16 KHz | 16 KHz | 16 KHz |
| Number of MFCCs | 20 | 20 | 80 | 80 |
| Hop length | 160 | 160 | 160 | 160 |
| Convolution Layers | 5×, 32 2 × 10 filters | 5×, 32 9 × 5 filters | 5×, 32 2 × 20 filters | 5×, 32 9 × 5 filters |
| Maxpool width & stride | 2 | 2 | 2 | 2 |
| Fully connected size | 16 | 16 | 32 | 32 |
| Dropout keep probability | 0.75 | 0.75 | 0.75 | 0.75 |
| Learning rate | $10^{-3} - 0.95 - 1000$ | $10^{-3} - 0.95 - 1000$ | $10^{-3} - 0.95 - 1000$ | $10^{-3} - 0.95 - 1000$ |

TABLE 7

Hyperparameters for speaker discriminative models for Audiobook dataset.

| Parameter | D5 | D6 | D7 | D8 (in Table 3) |
|---|---|---|---|---|
| Audio resampling freq. | 16 KHz | 16 KHz | 16 KHz | 16 KHz |
| Number of MFCCs | 20 | 20 | 80 | 80 |
| Hop length | 160 | 160 | 160 | 160 |
| Convolution layers | 3×, 32 9 × 5 filters | 5×, 32 2 × 10 | 7×, 32 9 × 5 | 5×, 32 2 × 10 |
| Maxpool width & stride | 2 | 2 | 2 | 2 |
| Fully connected size | 32 | 32 | 32 | 32 |
| Dropout keep probability | 0.75 | 0.75 | 0.75 | 0.75 |
| Learning rate | $10-3 - 0.95 - 1000$ | $10-3 - 0.99 - 2000$ | $10-3 - 0.95 - 1000$ | $10-3 - 0.99 - 2000$ |

TABLE 8

Classification accuracy using speaker discriminative models D1, D2, D3, and D4. The corresponding model hyperparameters are given in Table 6.

| Dataset | Multi-Speaker Model | D1 | D2 | D3 (in Table 3) | D4 |
|---|---|---|---|---|---|
| VCTK | Deep Voice 2 (20-layer WaveNet) | 97.87% | 97.60% | 99.92% | 99.84% |
| VCTK | Deep Voice 2 (40-layer WaveNet) | 98.56% | 98.68% | 100.00% | 100.00% |
| VCTK | Deep Voice 2 (60-layer WaveNet) | 98.56% | 98.44% | 99.68% | 99.80% |
| VCTK | Deep Voice 2 (80-layer WaveNet) | 99.06% | 99.21% | 99.96% | 99.96% |
| VCTK | Tacotron (Griffin-Lim) | 95.89% | 96.24% | 99.37% | 99.60% |
| VCTK | Tacotron (20-layer WaveNet) | 87.93% | 85.19% | 60.87% | 65.43% |
| VCTK | Ground Truth Data (16 kHz) | 98.07% | 98.00% | 99.74% | 99.66% |

TABLE 9

Classification accuracy using speaker discriminative models D5, D6, D7, and D8. The corresponding model hyperparameters are given in Table 7.

| Dataset | Multi-Speaker Model | D5 | D6 | D7 | D8 (in Table 3) |
|---|---|---|---|---|---|
| Audiobooks | Deep Voice 2 (80-layer WaveNet) | 98.24% | 95.66% | 96.80% | 97.42% |
| Audiobooks | Tacotron (Griffin-Lim) | 96.93% | 94.89% | 92.24% | 93.87% |
| Audiobooks | Tacotron (20-layer WaveNet) | 83.36% | 80.81% | 60.00% | 66.53% |
| Audiobooks | Ground Truth Data (16 kHz) | 96.30% | 97.49% | 98.39% | 98.80% |

What is claimed is:

1. A computer-implemented method for training a text-to-speech (TTS) system to synthesize human speech from text, comprising:
    converting an input text to phonemes corresponding to the input text, which is a transcription corresponding to training audio comprising utterances of a speaker, to phonemes corresponding to the input text and training audio;
    using the training audio, the phonemes corresponding to the input text, and at least a portion of a speaker identifier input indicating an identity of the speaker corresponding to the training audio to train a segmentation model to output segmented utterances by identifying phoneme boundaries in the training audio by aligning it with the corresponding phonemes;
    using the phonemes corresponding to the input text, the segmented utterances obtained from a segmentation model, and at least a portion of the speaker identifier input indicating an identity of the speaker to train a duration model to output phoneme durations of the phonemes in the segmented utterances;
    using the training audio, the phonemes corresponding to the input text, one or more frequency profiles of the training audio, and the at least a portion of speaker identifier input indicating an identity of the speaker to train a frequency model to output one or more frequency profiles; and
    using the training audio, the phonemes corresponding to the input text, the segmented utterances, the one or more frequency profiles, and the at least a portion of speaker identifier input indicating an identity of the speaker to train a vocal model to output a signal representing synthesized speech, in which the synthesized speech has one or more audio characteristics corresponding to the speaker.

2. The computer-implemented method of claim 1 wherein the segmentation model comprises a convolution-recurrent architecture with a connectionist temporal classification (CTC) loss applied to classify phoneme pairs and a phoneme boundary is identified between the phoneme pairs.

3. The computer-implemented method of claim 1 wherein the speaker identifier input comprises a speaker embedding representation and, when required for a site-specific use in the segmentation model, the duration model, the frequency model, or the vocal model, at least a portion of the speaker identifier input is transformed to an appropriate dimension and form.

4. The computer-implemented method of claim 3 wherein, for the segmentation model, batch-normalized activations are multiplied by a first site-specific speaker embedding representation from at least a portion of the speaker identifier input and recurrent layers are initialized with a second site-specific embedding representation from at least a portion of the speaker identifier input.

5. The computer-implemented method of claim 3 wherein, for the duration model, a first site-specific embedding representation of at least a portion of the speaker identifier input is used to initialize a neural network's (NN) hidden states and a second site-specific embedding of at least a portion of the speaker identifier input is provided as input to a first NN layer by concatenating it with feature representations of the phonemes.

6. The computer-implemented method of claim 5 wherein the duration model is configured to address duration prediction as sequence labeling and models a sequence by a conditional random field (CRF) with pairwise potentials at an output layer.

7. The computer-implemented method of claim 3 wherein, for the frequency model, one or more neural layers are initialized with a first site-specific speaker embedding of at least a portion of the speaker identifier input and a fundamental frequency prediction of an upsampled phoneme is computing using a second site-specific speaker embedding representation of at least a portion of the speaker identifier input and trainable model parameters.

8. The computer-implemented method of claim 3 wherein, for the vocal model, a site-specific speaker embedding representation of at least a portion of the speaker identifier input is concatenated onto each input frame of a conditioner of the vocal model.

9. The computer-implemented method of claim 1 wherein a frequency profile of a phoneme from the one or more frequency profiles comprises:
    a probability that the phoneme is voiced; and
    a time-dependent fundamental frequency profile.

10. A computer-implemented method for synthesizing speech from text, comprising:
    converting an input text to phonemes corresponding to the input text;
    inputting the phonemes and a duration speaker identifier into a trained duration neural network model that uses the phonemes and the duration speaker identifier to output phoneme durations corresponding to the phonemes of the input text and the duration speaker identifier;
    inputting the phonemes, the phoneme durations, and a frequency speaker identifier into a trained frequency neural network model to predict frequency profiles for the phonemes, in which a frequency profile for a phoneme comprises:
    a probability that the phoneme is voiced; and
    a fundamental frequency profile; and
    using a trained vocal neural network model that receives as an input a vocal speaker identifier, the phonemes, the phoneme durations, and the frequency profiles for the phonemes to synthesize a signal representing synthesized speech of the input text, in which the synthesized speech has audio characteristics corresponding to the duration speaker identifier, the frequency speaker identifier, and the vocal speaker identifier.

11. The computer-implemented method of claim 10 wherein the duration speaker identifier, the frequency speaker identifier, and the vocal speaker identifier comprise a shared speaker embedding representation and, when required for a site-specific use in the trained duration neural network model, the trained frequency neural network model, or the trained vocal neural network model, respectively, is transformed to an appropriate dimension and form.

12. The computer-implemented method of claim 11 wherein, for the trained duration neural network model, a first site-specific embedding representation of the duration speaker identifier is used to initialize a neural network's (NN) hidden states and a second site-specific embedding representation of the duration speaker identifier is provided as input to a first NN layer by concatenating it with feature representations of the phonemes.

13. The computer-implemented method of claim 11 wherein, for the trained frequency neural network model, one or more recurrent layers are initialized with a first site-specific speaker embedding representation of the frequency speaker identifier and a fundamental frequency prediction of a phoneme is computing using a second site-specific speaker embedding of the frequency speaker identifier and trained model parameters.

14. The computer-implemented method of claim 11 wherein, for the trained vocal neural network model, a site-specific speaker embedding representation of the vocal speaker identifier is concatenated onto each input frame in a conditioner network of the trained vocal model.

15. The computer-implemented method of claim 10 the trained duration neural network model, the trained frequency neural network model, and the trained vocal neural network model were obtained by training a duration neural network model, a frequency neural network model, and a vocal neural network model by performing steps comprising:
   converting an input training text to phonemes corresponding to the input training text, which is a transcription corresponding to training audio comprising utterances of a speaker, to phonemes corresponding to the input training text and training audio;
   using the training audio, the phonemes corresponding to the input training text, and at least a portion of a speaker identifier input indicating an identity of the speaker corresponding to the training audio to train a segmentation neural network model to output segmented utterances by identifying phoneme boundaries in the training audio by aligning it with the corresponding phonemes;
   using the phonemes corresponding to the input training text, the segmented utterances obtained from a segmentation neural network model, and at least a portion of the speaker identifier input indicating an identity of the speaker to train the duration neural network model to output phoneme durations of the phonemes in the segmented utterances;
   using the training audio, the phonemes corresponding to the input training text, one or more frequency profiles of the training audio, and the at least a portion of speaker identifier input indicating an identity of the speaker to train the frequency neural network model to output one or more frequency profiles; and
   using the training audio, the phonemes corresponding to the input training text, the segmented utterances, the one or more frequency profiles, and the at least a portion of speaker identifier input indicating an identity of the speaker to train the vocal neural network model to output a signal representing synthesized speech, in which the synthesized speech has audio characteristics corresponding to the speaker.

16. A non-transitory computer-readable medium or media comprising one or more sequences of instructions which, when executed by at least one processor, causes steps to be performed comprising:
   converting an input text to phonemes corresponding to the input text, which is a transcription corresponding to training audio comprising utterances of a speaker, to phonemes corresponding to the input text and training audio;
   using the training audio, the phonemes corresponding to the input text, and at least a portion of a speaker identifier input indicating an identity of the speaker corresponding to the training audio to train a segmentation model to output segmented utterances by identifying phoneme boundaries in the training audio by aligning it with the corresponding phonemes;
   using the phonemes corresponding to the input text, the segmented utterances obtained from a segmentation model, and at least a portion of the speaker identifier input indicating an identity of the speaker to train a duration model to output phoneme durations of the phonemes in the segmented utterances;
   using the training audio, the phonemes corresponding to the input text, one or more frequency profiles of the training audio, and the at least a portion of speaker identifier input indicating an identity of the speaker to train a frequency model to output one or more frequency profiles; and
   using the training audio, the phonemes corresponding to the input text, the segmented utterances, the one or more frequency profiles, and the at least a portion of speaker identifier input indicating an identity of the speaker to train a vocal model to output a signal representing synthesized speech, in which the synthesized speech has one or more audio characteristics corresponding to the speaker.

17. The non-transitory computer-readable medium or media of claim 16 wherein the segmentation model comprises a convolution-recurrent architecture with a connectionist temporal classification (CTC) loss applied to classify phoneme pairs and a phoneme boundary is identified between the phoneme pairs.

18. The non-transitory computer-readable medium or media of claim 16 wherein the speaker identifier input comprises a speaker embedding representation and, when required for a site-specific use in the segmentation model, the duration model, the frequency model, or the vocal model, at least a portion of the speaker identifier input is transformed to an appropriate dimension and form.

19. The non-transitory computer-readable medium or media of claim 16 wherein, for the segmentation model, batch-normalized activations are multiplied by a first site-specific speaker embedding representation from at least a portion of the speaker identifier input and recurrent layers are initialized with a second site-specific embedding representation from at least a portion of the speaker identifier input.

20. The non-transitory computer-readable medium or media of claim 19 wherein, for the duration model, a first site-specific embedding representation of at least a portion of the speaker identifier input is used to initialize a neural network's (NN) hidden states and a second site-specific embedding of at least a portion of the speaker identifier input is provided as input to a first NN layer by concatenating it with feature representations of the phonemes.

* * * * *